United States Patent
Elshafie et al.

(10) Patent No.: US 11,844,064 B2
(45) Date of Patent: Dec. 12, 2023

(54) PARAMETER(S) FOR RELAYING OPERATION

(71) Applicant: QUALCOMM Incorporated, San Diego, CA (US)

(72) Inventors: Ahmed Elshafie, San Diego, CA (US); Seyedkianoush Hosseini, San Diego, CA (US); Sony Akkarakaran, Poway, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/233,086

(22) Filed: Apr. 16, 2021

(65) Prior Publication Data

US 2022/0338213 A1     Oct. 20, 2022

(51) Int. Cl.
| | |
|---|---|
| *H04W 72/00* | (2023.01) |
| *H04W 72/1263* | (2023.01) |
| *H04W 72/121* | (2023.01) |
| *H04L 5/14* | (2006.01) |
| *H04W 72/02* | (2009.01) |
| *H04W 8/24* | (2009.01) |

(52) U.S. Cl.
CPC ........... *H04W 72/1263* (2013.01); *H04L 5/14* (2013.01); *H04W 8/24* (2013.01); *H04W 72/02* (2013.01); *H04W 72/121* (2013.01)

(58) Field of Classification Search
None
See application file for complete search history.

(56) References Cited

U.S. PATENT DOCUMENTS

| | | | |
|---|---|---|---|
| 9,615,300 B1* | 4/2017 | Marupaduga | H04W 36/0085 |
| 2008/0137581 A1* | 6/2008 | Doppler | H04W 84/047 370/315 |
| 2009/0196332 A1* | 8/2009 | Miyatani | H04B 7/026 375/214 |
| 2012/0094682 A1* | 4/2012 | Ode | H04B 7/15557 455/450 |
| 2016/0044608 A1* | 2/2016 | Denic | H04W 52/0219 370/315 |
| 2021/0037446 A1* | 2/2021 | Wu | H04W 40/22 |
| 2021/0259051 A1* | 8/2021 | Latheef | H04W 40/22 |
| 2021/0336967 A1* | 10/2021 | Yasukawa | H04W 40/22 |
| 2022/0225448 A1* | 7/2022 | Li | H04W 68/005 |
| 2022/0337989 A1* | 10/2022 | Ferdi | H04W 76/14 |

* cited by examiner

*Primary Examiner* — Brandon M Renner
(74) *Attorney, Agent, or Firm* — Loza & Loza, LLP

(57) ABSTRACT

Aspects relate to signaling at least one relaying parameter for a wireless communication device that supports relaying operations. In some examples, the wireless communication device may send such a relaying parameter to a scheduling entity. The scheduling entity may then schedule a relaying operation for the wireless communication device based on the relaying parameter. For example, the scheduling entity may select the resources to be used for the relaying operation based on the relaying parameter. In some examples, a relaying parameter may indicate one or more of a relaying capability of a wireless communication device, an operational condition (e.g., requirement) for relaying by a wireless communication device, a relaying configuration for a wireless communication device, or a combination thereof.

29 Claims, 19 Drawing Sheets

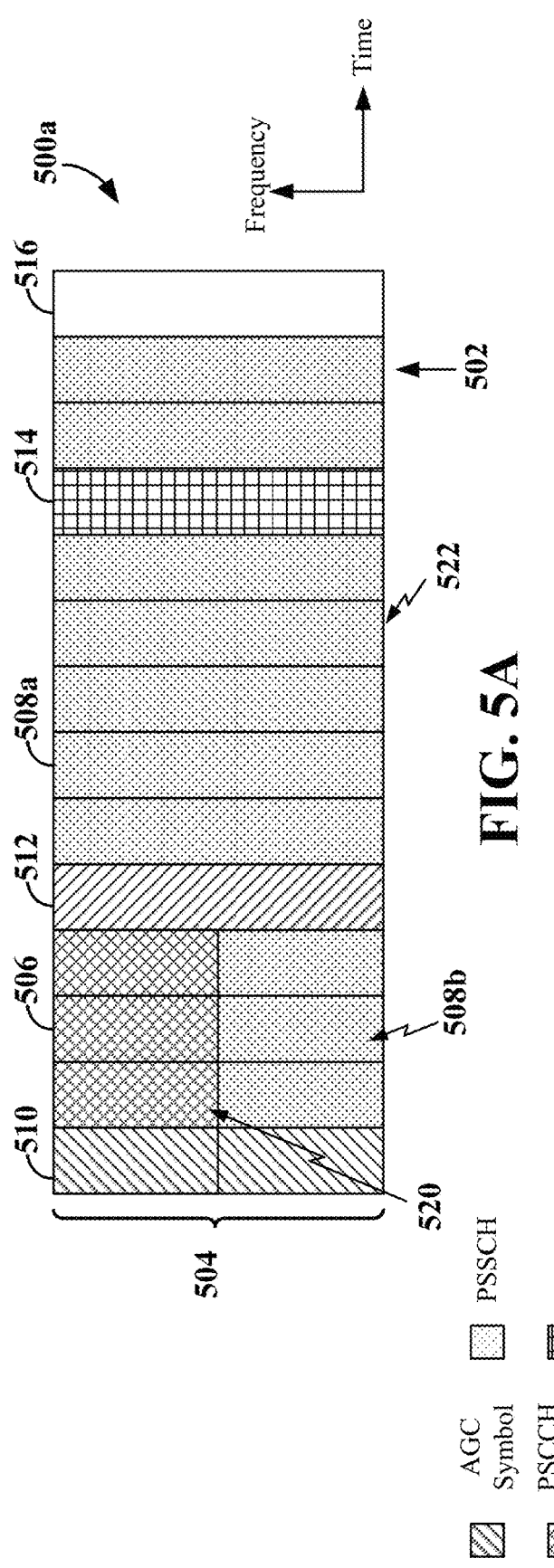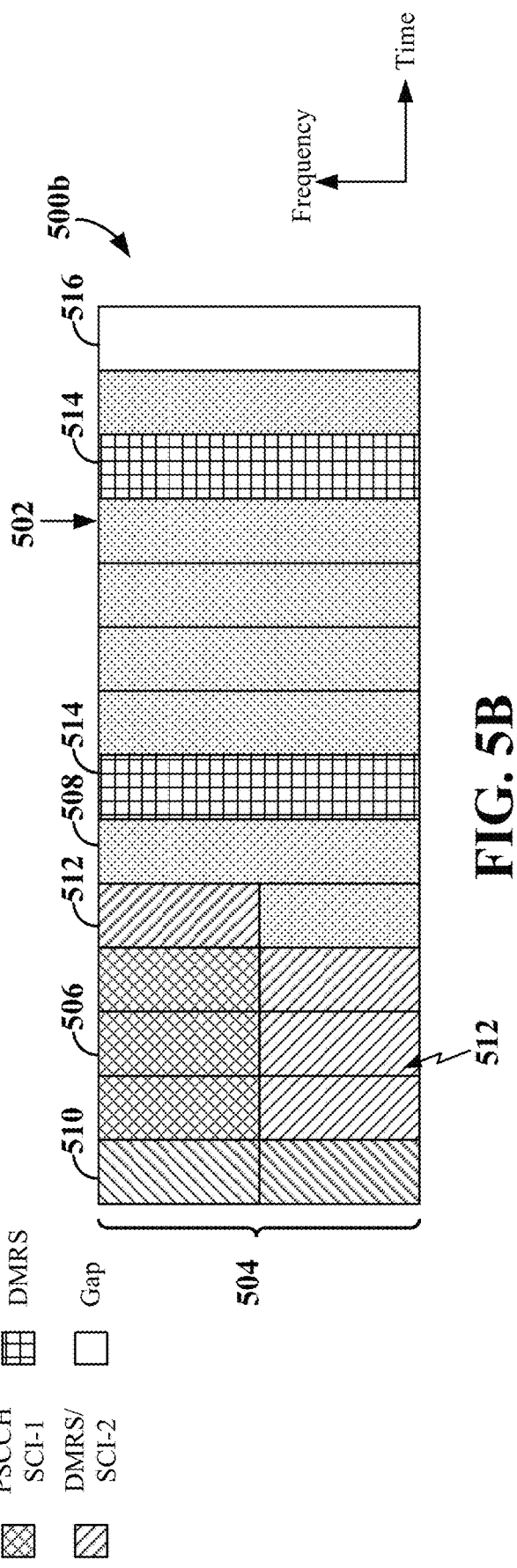
FIG. 5A
FIG. 5B

PARAMETER(S) FOR RELAYING OPERATION

TECHNICAL FIELD

The technology discussed below relates generally to wireless communication and, more particularly, to one or more relaying parameters associated with a wireless communication device.

INTRODUCTION

In many existing wireless communication systems, a cellular network is implemented by enabling wireless communication devices to communicate with one another through signaling with a nearby base station or cell. As a wireless communication device moves across the service area, handovers take place such that each wireless communication device maintains communication with one another via its respective cell.

Another scheme for a wireless communication system is a device to device (D2D) network, in which wireless communication devices may signal one another directly, rather than via an intermediary base station or cell. D2D communication networks may utilize direct signaling (e.g., sidelink signaling) to facilitate direct communication between wireless communication devices over a proximity service (ProSe) PC5 interface. In some D2D configurations, wireless communication devices may further communicate in a cellular system, generally under the control of a base station. Thus, the wireless communication devices may be configured for uplink and downlink signaling via a base station and further for sidelink signaling directly between the wireless communication devices without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a wireless communication device is disclosed. The method may include transmitting a relaying parameter for the wireless communication device to a scheduling entity, receiving scheduling information for at least one relaying operation from the scheduling entity after the relaying parameter is transmitted, and relaying data according to the scheduling information.

In some examples, a wireless communication device may include a transceiver, a memory, and a processor coupled to the transceiver and the memory. The processor and the memory may be configured to transmit a relaying parameter for the wireless communication device to a scheduling entity via the transceiver, receive scheduling information for at least one relaying operation from the scheduling entity via the transceiver after the relaying parameter is transmitted, and relay data according to the scheduling information.

In some examples, a wireless communication device may include means for transmitting a relaying parameter for the wireless communication device to a scheduling entity, means for receiving scheduling information for at least one relaying operation from the scheduling entity after the relaying parameter is transmitted, and means for relaying data according to the scheduling information.

In some examples, an article of manufacture for use by a wireless communication device includes a computer-readable medium having stored therein instructions executable by one or more processors of the wireless communication device to transmit a relaying parameter for the wireless communication device to a scheduling entity, receive scheduling information for at least one relaying operation from the scheduling entity after the relaying parameter is transmitted, and relay data according to the scheduling information.

In some examples, a method for wireless communication at a scheduling entity is disclosed. The method may include receiving a relaying parameter from a wireless communication device, generating, based on the relaying parameter, scheduling information for at least one relaying operation to be performed by the wireless communication device, and transmitting the scheduling information to the wireless communication device.

In some examples, a scheduling entity may include a transceiver, a memory, and a processor communicatively coupled to the transceiver and the memory. The processor and the memory may be configured to receive a relaying parameter from a wireless communication device via the transceiver, generate, based on the relaying parameter, scheduling information for at least one relaying operation to be performed by the wireless communication device, and transmit the scheduling information to the wireless communication device via the transceiver.

In some examples, a scheduling entity may include means for receiving a relaying parameter from a wireless communication device, means for generating, based on the relaying parameter, scheduling information for at least one relaying operation to be performed by the wireless communication device, and means for transmitting the scheduling information to the wireless communication device.

In some examples, an article of manufacture for use by a scheduling entity includes a computer-readable medium having stored therein instructions executable by one or more processors of the scheduling entity to receive a relaying parameter from a wireless communication device, generate, based on the relaying parameter, scheduling information for at least one relaying operation to be performed by the wireless communication device, and transmit the scheduling information to the wireless communication device.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 5A is a conceptual diagram illustrating an example of a sidelink slot structure according to some aspects.

FIG. 5B is a conceptual diagram illustrating another example of a sidelink slot structure according to some aspects.

DETAILED DESCRIPTION

Figure 1:
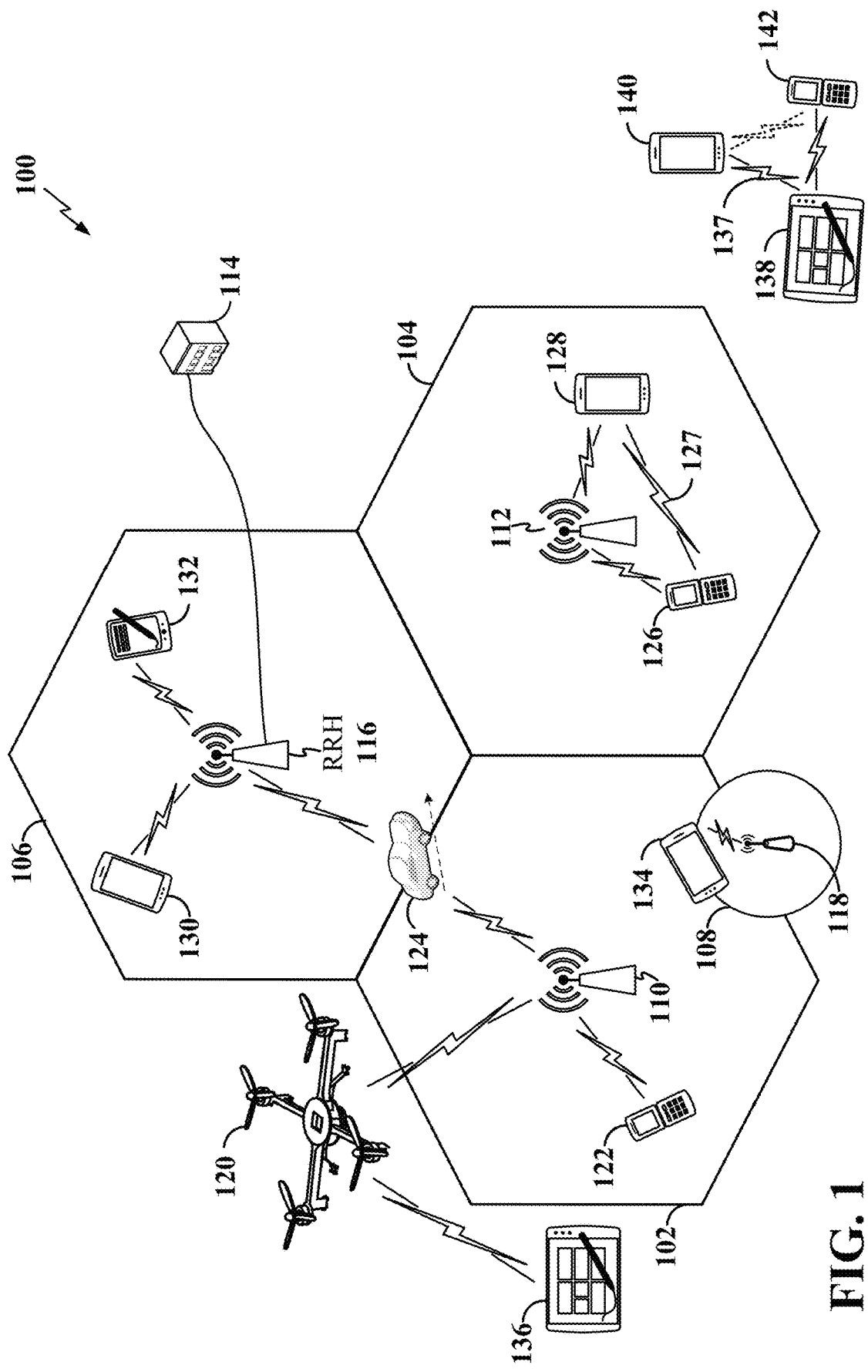
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to signaling at least one relaying parameter for a wireless communication device that supports relaying operations. In some examples, the wireless communication device may send such a relaying parameter to a scheduling entity. The scheduling entity may then schedule a relaying operation for the wireless communication device based on the relaying parameter. For example, the scheduling entity may select the resources to be used for the relaying operation based on the relaying parameter.

A relaying parameter may take different forms in different examples. A relaying parameter may indicate, for example, one or more of a relaying capability of a wireless communication device, an operational condition (e.g., requirement) for relaying by a wireless communication device, a relaying configuration for a wireless communication device, or a combination thereof. In some examples, a relaying parameter indicates how many data packets a wireless communication device can buffer and/or relay. In some examples, a relaying parameter indicates a switching time for a wireless communication device to switch from a first type of relaying to a second type of relaying. In some examples, a relaying parameter indicates how many concurrent relaying operations a wireless communication device supports and, optionally, the relaying type(s) of the concurrent relaying operations. In some examples, a relaying parameter indicates a period of time that a wireless communication device does not perform relaying. In some examples, a relaying parameter indicates a relaying duplexing capability of a wireless communication device (e.g., whether the relaying device supports full-duplex relaying). In some examples, a relaying parameter indicates a relaying condition of a wireless communication device (e.g., resources, reliability, data rate, throughput, or error rate requested by the wireless communication device). In some examples, a relaying parameter indicates energy harvesting information for a wireless communication device (e.g., the amount of energy needed to be harvested for a relaying operation).

The various concepts presented throughout this disclosure may be implemented across a broad variety of telecommunication systems, network architectures, and communication standards. Referring now to FIG. 1, as an illustrative example without limitation, a schematic illustration of a radio access network (RAN) 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eU-TRAN) standards, often referred to as Long Term Evolution (LTE). The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station (e.g., the UAV 120). Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full-duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
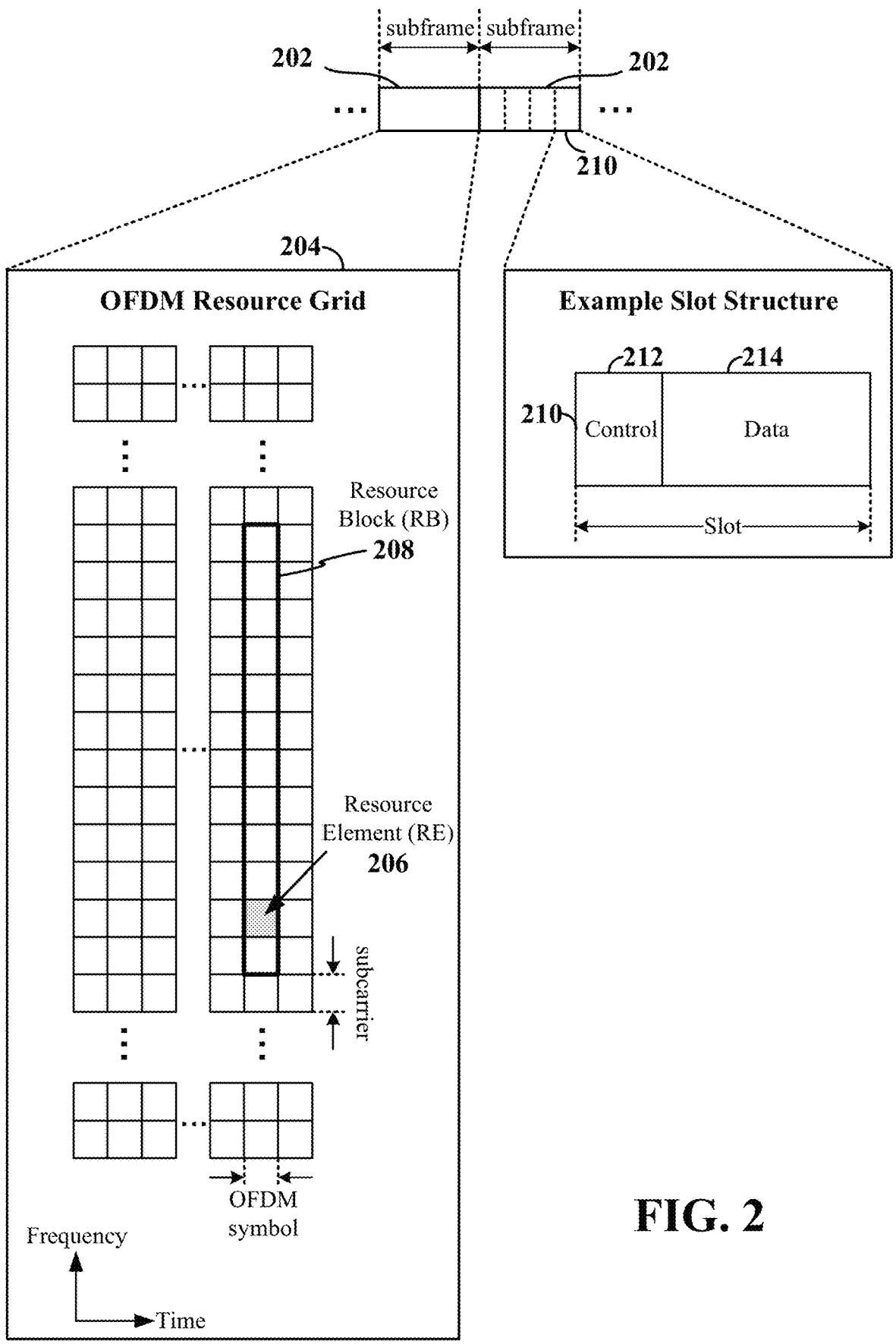
FIG. 2 is a schematic diagram illustrating organization of wireless resources in an air interface utilizing orthogonal frequency divisional multiplexing (OFDM) according to some aspects.

Referring now to FIG. 2, an expanded view of an example subframe 202 is illustrated, showing an OFDM resource grid. However, as those skilled in the art will readily appreciate, the physical layer (PHY layer) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs).

Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely an example, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
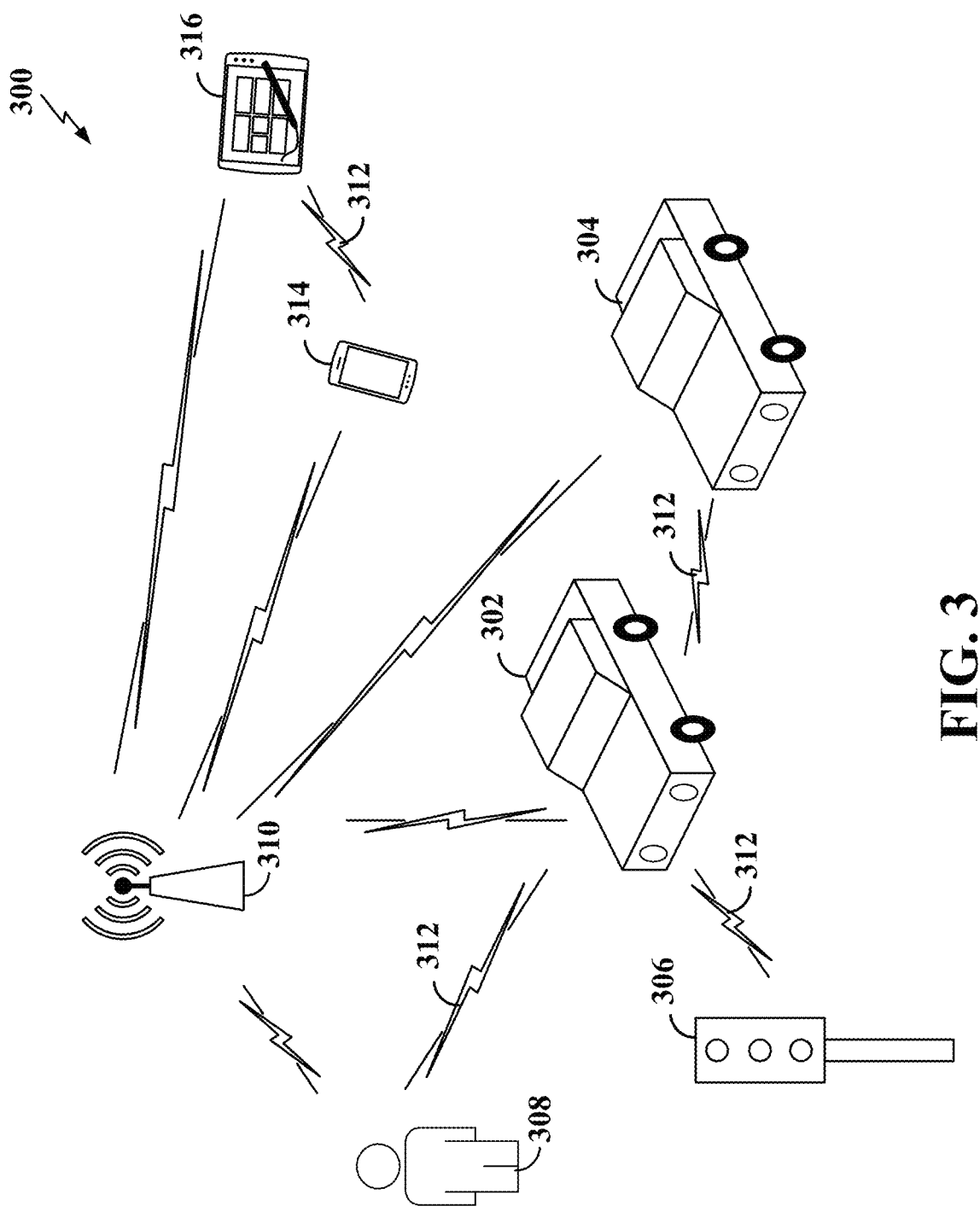
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

V2X transmissions may include, for example, unicast transmissions, groupcast transmissions, and broadcast transmissions. A unicast transmission may include, for example, a transmission from a vehicle (e.g., vehicle 302) to one other vehicle (e.g., vehicle 304). A groupcast transmission may include, for example, a transmission when group of UEs (e.g., vehicles 302 and 304) form a cluster. In this case, data may be groupcasted within the cluster. A broadcast transmission may include, for example, a transmission from a UE (e.g., vehicle 302) to surrounding receivers (e.g., vehicle 304, a roadside unit (RSU) 306, mobile devices 308 of pedestrians/cyclists, the network (e.g., base station 310), or any combination thereof) in proximity to the transmitting UE.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. The base station 310 may further activate preconfigured sidelink grants (e.g., configured grants) for sidelink communication among the sidelink devices. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may also be transmitted on the PSCCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 4:
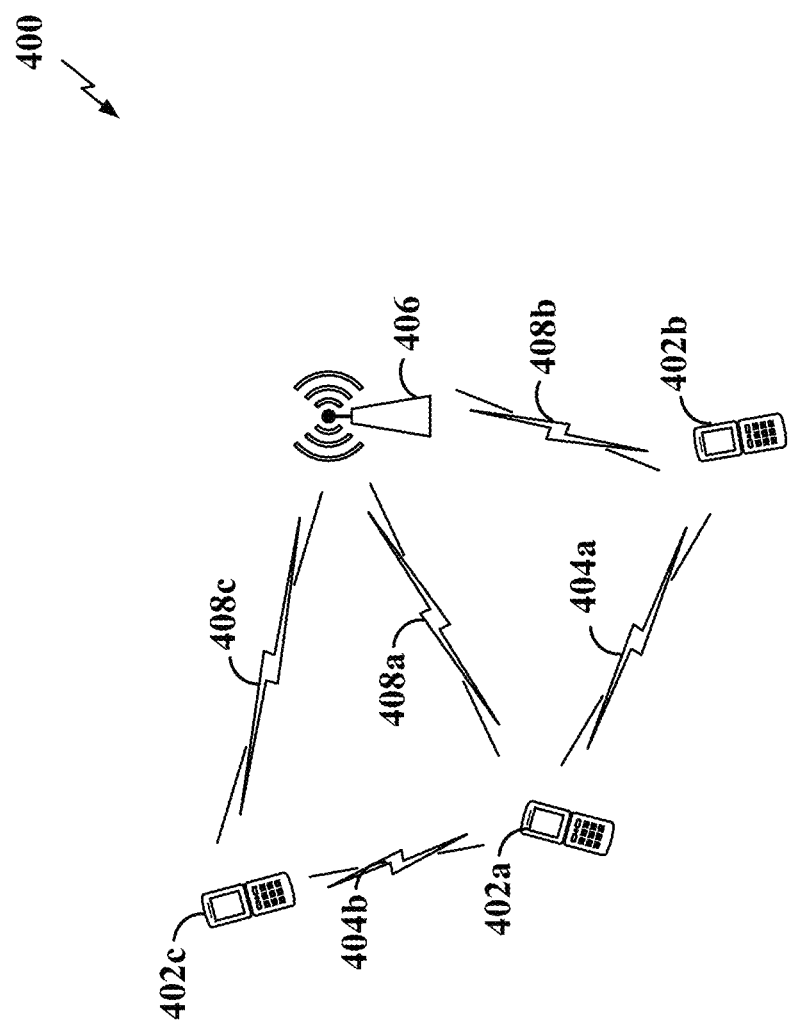
FIG. 4 is a diagram illustrating an example of a wireless communication network for facilitating both cellular and sidelink communication according to some aspects.

FIG. 4 is a diagram illustrating an example of a wireless communication network 400 for facilitating both cellular and sidelink communication. The wireless communication network 400 may correspond, for example, to the RAN 100 illustrated in FIG. 1. The wireless communication network 400 includes a plurality of wireless communication devices 402a, 402b, and 402c and a base station (e.g., eNB or gNB) 406. In some examples, the wireless communication devices 402a, 402b, and 402c may be UEs capable of implementing sidelink communication (e.g., V2X or D2D). The wireless communication devices 402a, 402b, and 402c may correspond to any of the UEs or scheduled entities shown in any of FIGS. 1, 2, 7, 12, and 15. The base station 406 may correspond to any of the base stations or scheduling entities shown in any of FIGS. 1, 2, and 7.

The wireless communication devices 402a and 402b may communicate over a first sidelink 404a, while wireless communication devices 402a and 402c may communicate over a second sidelink 404b. Each of the sidelinks 404a and 404b may utilize, for example, a PC5 interface. Wireless communication devices 402a, 402b, and 402c may further communicate with the base station 406 over respective Uu links 408a, 408b, and 408b. The sidelink communication over the sidelinks 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 404a and 404b and Uu links 408a-408c, such that resources on the common carrier may be allocated for both sidelink communication between wireless communication devices 402a-402c and cellular communication (e.g., uplink and downlink communication) between the wireless communication devices 402a-402c and the base station 406. For example, the wireless communication network 400 may be configured to support a Mode 1 sidelink network in which resources for both sidelink and cellular communication are scheduled by the base station 406. In other examples in which Mode 2 sidelink is implemented on the sidelinks 404a and 404b, the wireless communication devices 402a-402c may autonomously select sidelink resources (e.g., from one or more frequency bands or sub-bands designated for sidelink communication) for communication therebetween. In this example, the wireless communication devices 402a-402c may function as both scheduling entities and scheduled entities scheduling sidelink resources for communication with each other.

FIGS. 5A and 5B are diagrams illustrating examples of sidelink slot structures according to some aspects. The sidelink slot structures may be utilized, for example, in a V2X or other D2D network implementing sidelink. In the examples shown in FIGS. 5A and 5B, time is in the horizontal direction with units of symbols 502 (e.g., OFDM symbols); and frequency is in the vertical direction. Here, a carrier bandwidth 504 allocated for sidelink wireless communication is illustrated along the frequency axis. The carrier bandwidth 504 may include a plurality of sub-channels, where each sub-channel may include a configurable number of PRBs (e.g., 10, 14, 20, 24, 40, 44, or 100 PRBs).

Each of FIGS. 5A and 5B illustrate an example of a respective slot 500a or 500b including fourteen symbols 502 that may be used for sidelink communication. However, it should be understood that sidelink communication can be configured to occupy fewer than fourteen symbols in a slot 500a or 500b, and the disclosure is not limited to any particular number of symbols 502. Each sidelink slot 500a and 500b includes a physical sidelink control channel (PSCCH) 506 occupying a control region of the slot 500a and 500b and a physical sidelink shared channel (PSSCH) 508 occupying a data region 520 of the slot 500a and 500b. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIGS. 5A and 5B, the PSCCH 506 and corresponding PSSCH 508 are transmitted in the same slot 500a and 500b. In other examples, the PSCCH 506 may schedule a PSSCH in a subsequent slot.

In some examples, the PSCCH 506 duration is configured to be two or three symbols. In addition, the PSCCH 506 may be configured to span a configurable number of PRBs, limited to a single sub-channel. For example, the PSCCH 506 may span 10, 12, 14, 20, or 24 PRBs of a single sub-channel. A DMRS may further be present in every PSCCH symbol. In some examples, the DMRS may be placed on every fourth RE of the PSCCH 506. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 5A and 5B, the starting symbol for the PSCCH 506 is the second symbol of the corresponding slot 500a or 500b and the PSCCH 506 spans three symbols.

The PSSCH 508 may be time-division multiplexed (TDMed) with the PSCCH 506 and/or frequency-division multiplexed (FDMed) with the PSCCH 506. In the example shown in FIG. 5A, the PSSCH 508 includes a first portion 508a that is TDMed with the PSCCH 506 and a second portion 508b that is FDMed with the PSCCH 506. In the example shown in FIG. 5B, the PSSCH 508 is TDMed with the PSCCH 506.

One and two layer transmissions of the PSSCH 508 may be supported with various modulation orders (e.g., quadrature phase-shift keying (QPSK), or quadrature amplitude modulation (QAM) such as 16-QAM, 64-QAM and 246-QAM). In addition, the PSSCH 508 may include DMRSs 514 configured in a two, three, or four symbol DMRS pattern. For example, slot 500a shown in FIG. 5A illustrates a two symbol DMRS pattern, while slot 500b shown in FIG. 5B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500a or 500b. In addition, a gap symbol 516 is present after the PSSCH 508 in each slot 500a and 500b.

Each slot 500a and 500b further includes SCI-2 512 mapped to contiguous RBs in the PSSCH 508 starting from the first symbol containing a PSSCH DMRS. In the example shown in FIG. 5A, the first symbol containing a PSSCH DMRS is the fifth symbol occurring immediately after the last symbol carrying the PSCCH 506. Therefore, the SCI-2 512 is mapped to RBs within the fifth symbol. In the example shown in FIG. 5B, the first symbol containing a PSSCH DMRS is the second symbol, which also includes the PSCCH 506. In addition, the SCI-2/PSSCH DMRS 512 are shown spanning symbols two through five. As a result, the SCI-2/PSSCH DMRS 512 may be FDMed with the PSCCH 506 in symbols two through four and TDMed with the PSCCH 506 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 506 may be blind decoded at the receiving wireless communication device. However, since the format, starting location, and number of REs of the SCI-2 512 may be derived from the SCI-1, blind decoding of SCI-2 is not needed at the receiver (receiving UE).

In each of FIGS. 5A and 5B, the second symbol of each slot 500a and 500b is copied onto (repeated on) a first symbol 510 thereof for automatic gain control (AGC) settling. For example, in FIG. 5A, the second symbol containing the PSCCH 506 FDMed with the PSSCH second portion 508b may be transmitted on both the first symbol and the second symbol. In the example shown in FIG. 5B, the second symbol containing the PSCCH 506 FDMed with the SCI-2/PSSCH DMRS 512 may be transmitted on both the first symbol and the second symbol.

Figure 6:
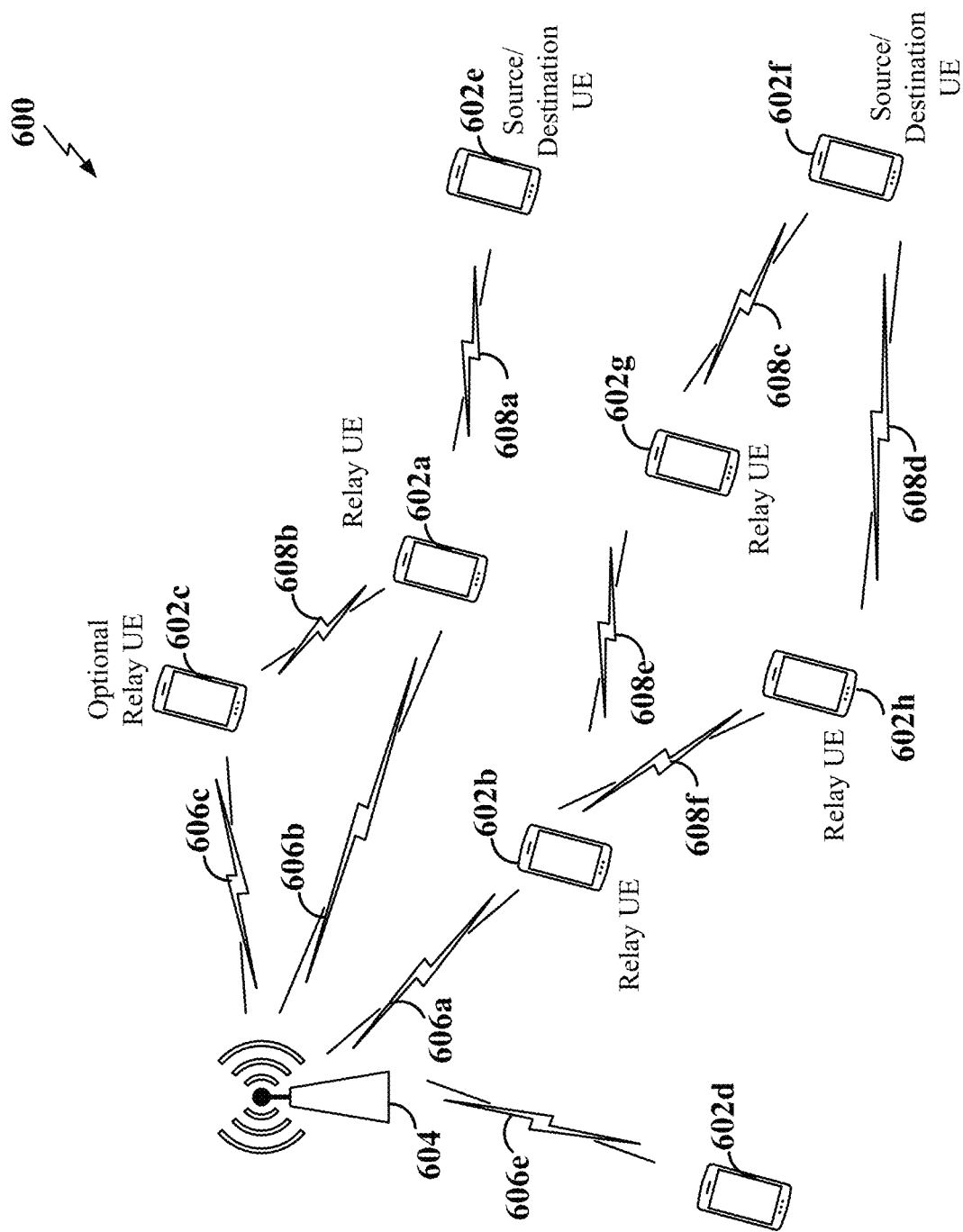
FIG. 6 is a diagram illustrating an example of a wireless communication network for facilitating sidelink relaying according to some aspects.

In some examples, a device that supports D2D communication may be used to relay data from one device (e.g., a base station or a sidelink device) to another device (e.g., a base station or a sidelink device). FIG. 6 is a diagram illustrating an exemplary wireless communication network 600 employing D2D relaying. The wireless communication network 600 may correspond, for example, to the RAN 100 illustrated in FIG. 1. The wireless communication network 600 may include a fifth generation base station (e.g., a gNB) 604 in wireless communication one or more UEs 602a, 602b, 602c, 602d, 602e, 602f, 602g, and 602h. In the example shown in FIG. 6, the base station 604 may directly communicate with each of the UEs 602a, 602b, 602c, and 602d via a respective wireless communication link 606a, 606b, 606c, and 606d (e.g., Uu links) Each of the wireless communication links 606a, 606b, 606c, and 606d may utilize a sub-6 GHz carrier frequency or a mmWave carrier frequency.

In addition, a D2D relay link (e.g., a sidelink) 608a may be established between the UE 602a and another UE 602e to enable relaying of information between the base station 604 and the UE 602e. In this context, the UE 602a may be referred to as a relay UE and the UE 602e may be referred to as a source UE for uplink communication or a destination UE for downlink communication. The relay link 608a may be established between the UE 602a and UE 602e due to, for example, distance or signal blocking between the base station 604 and UE 602e, weak receiving capability of the UE 602e, low transmission power of the UE 602e, and/or limited battery capacity of UE 602e.

In some examples, the relay link 608a between UEs 602a and 602e may enable communication between the base station 604 and UE 602e to be relayed via UE 602a over wireless communication link (e.g., the Uu interface) 606a and relay link 608a. In some examples, the UE 602a may communicate with the base station 604 via another relay UE. For example, a D2D relay link 608b may be established between the UE 602a and the UE 602c to enable relaying of information between the base station 604 and the UE 602a. Thus, information exchanged between the base station 604 and the UE 602e may be routed via the link 606b, via the links 608b and 606c, or via both of these paths.

In some examples, data may be relayed over multiple paths to increase the likelihood that the data will reach the intended destination (e.g., since some paths may be less reliable than others) and/or reduce the amount of time that it takes the data to reach the intended destination (e.g., by providing diversity to enable a receiving device to readily decode the data). For example, a D2D relay link 608c may be established between the UE 602f and the UE 602g and another D2D relay link 608e may be established between the UE 602g and the UE 602b to enable relaying of information between the base station 604 and the UE 602f. In addition, a D2D relay link 608d may be established between the UE 602f and the UE 602h and another D2D relay link 608f may be established between the UE 602h and the UE 602b to also enable relaying of information between the base station 604 and the UE 602f.

In some examples, the base station 604 may use broadcast or groupcast signaling (e.g., transmitted via a Uu interface) to set up a multi-hop tunnel (e.g., for uplink communication and/or downlink communication) to an endpoint (e.g., a source UE or a destination UE) via at least one UE relay. For example, the base station 604 may schedule dedicated time and frequency resources for the relay(s) and the endpoint to use to relay data between the base station 604 and the endpoint.

In some examples, a sidelink UE may be able to discover its neighbor sidelink UEs. For example, the UE 602e (or any other UE of FIG. 6) may detect one or more neighbor relay UEs, awaken the neighbor relay UE(s), and receive and process discovery signals from the neighbor relay UE(s). In other examples, a UE may assist another UE in discovering and activating neighbor relay UEs. For example, the UE 602a may monitor a scope of possible frequency spectrums to identify the device bandwidth of one or more neighbor relay UEs, exchange messages with each of neighbor relay UE to determine the availability of each neighbor relay UE to relay data to and/or from the UE 602e, and then indicate to each available neighbor relays to transmit a discovery signal to the UE 602e.

The disclosure relates in some aspects to enabling a wireless communication device (e.g., a sidelink device such as a UE) to manage its relaying operations. For example, there may be power limits, hardware limits, operational limits, or other factors that impact relaying operations of the wireless communication device.

In accordance with the teachings herein, a wireless communication device that supports relaying may advertise these limits/factors to facilitate better management of relaying operations at the wireless communication device. For example, a wireless communication device may send one or more relaying parameters (or some other suitable indication) based on these limits/factors to a scheduling entity (e.g., a base station, a sidelink device, etc.) that may schedule relay operations for the wireless communication device. The scheduling entity may thereby determine how to schedule relaying operations for the wireless communication device taking into account the limits/factors that affect relaying by the wireless communication device. For example, a scheduling entity (e.g., a gNB or a monitoring UE) may decide, based on one or more relaying parameters, how to assign time resources and/or frequency resources for a data transmission/reception that will be relayed by the wireless communication device.

A wireless communication device may send a relaying parameter to a scheduling entity in different ways in different examples. For example, a wireless communication device may directly send a relaying parameter to a base station via a Uu interface, a media access control-control element (MAC-CE), an RRC message, or a dedicated PUCCH. As another example, a wireless communication device may send a relaying parameter to a sidelink scheduling entity via a sideline (SL) MAC-CE, a SL RRC message, or a PSCCH.

In some examples, a relaying parameter may indicate one or more of a relaying capability of a wireless communication device, an operational condition (e.g., requirement) for relaying by a wireless communication device, or a combination thereof. Examples of relaying capabilities include, without limitation, the number of data packets a wireless communication device can buffer and/or relay, the amount of time it takes for a wireless communication device to switch from a first type of relaying to a second type of relaying, the number of concurrent relaying operations supported by a wireless communication device, and a relaying duplexing capability of a wireless communication device. Examples of operational conditions include, without limitation, a period of time that a wireless communication device does not perform relaying (e.g., resting period), relaying conditions (e.g., resources, reliability, data rate, throughput, or error rate) requested by a wireless communication device, and energy harvesting requirements of a wireless communication device. Several examples of relaying parameters will be discussed in conjunction with FIGS. 7-13.

In a first example, a wireless communication device may signal a relaying parameter that indicates the number of data packets or transport blocks (TBs), of a certain size, that the wireless communication device can buffer and/or relay. This relaying parameter may enable a scheduling entity to not over-schedule (e.g., overwhelm) the wireless communication device when it is operating as a relay node. For example, based on the relaying parameter, the scheduling entity may restrict the number of resources allocated for a relaying operation so that the wireless communication device will not be expected to buffer and/or relay more data than it can handle. This relaying parameter may also enable a scheduling entity to avoid assigning resources to a wireless communication device that is unable to accept any more relaying bits, which could otherwise result in wasted relaying scheduling (e.g., scheduling resources that will not be used) and/or wasted power (e.g., at the wireless communication device).

In some examples, signaling the relaying parameter for the first example may involve transmitting an indication, in units of a basic TB size (e.g., TBS index 0). For example, a wireless communication device may inform the scheduling entity that the wireless communication device can relay X TBs of a size corresponding to TBS 0. Other indications of the amount of relay data that can be served by a wireless communication device may be used in other examples.

Figure 7:
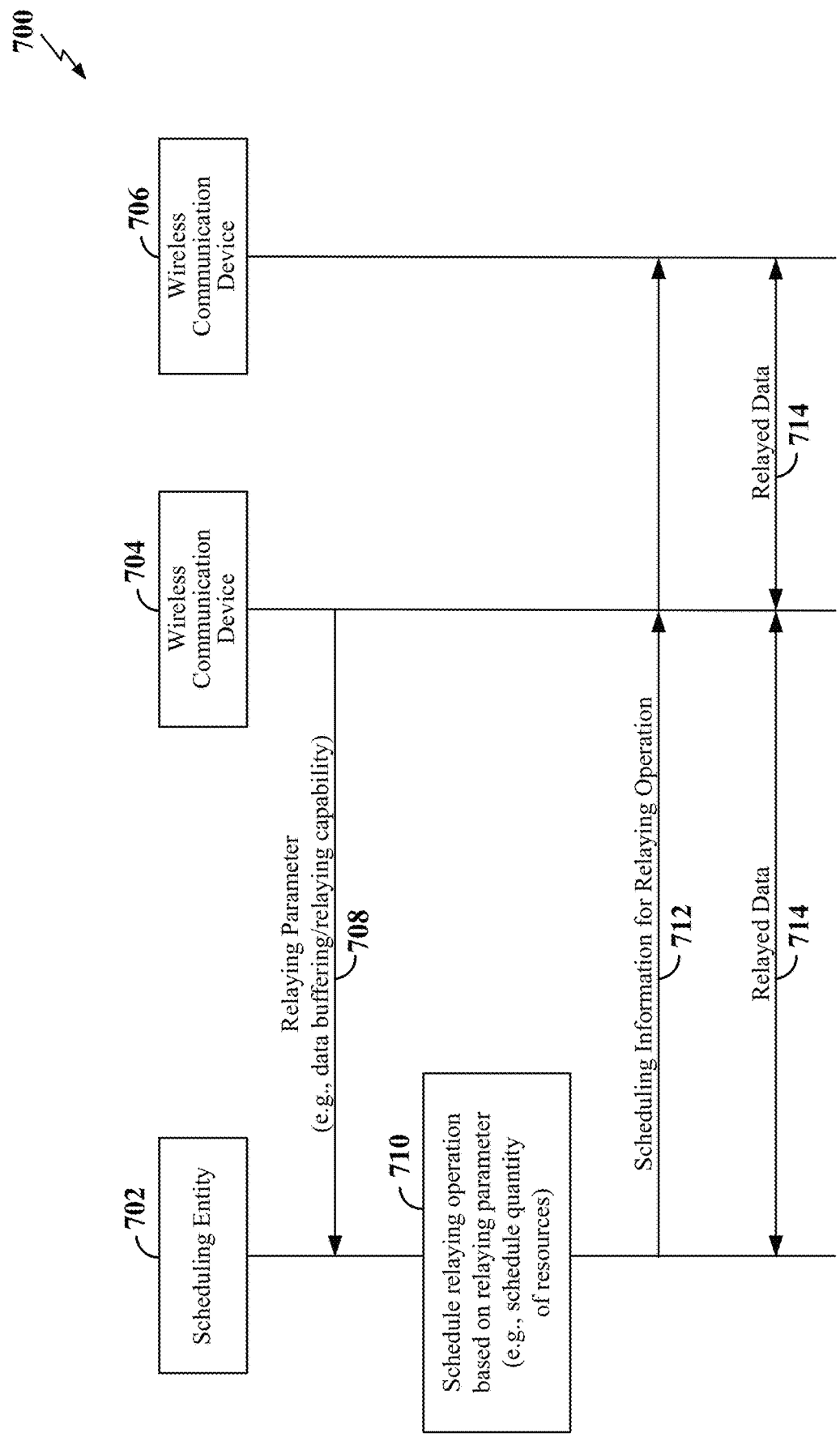
FIG. 7 is a signaling diagram illustrating an example of signaling an indication of how many data packets a wireless communication device can buffer and/or relay according to some aspects.

FIG. 7 is a signaling diagram illustrating an example of signaling between a scheduling entity 702 (e.g., a base station) and a wireless communication device 704 (e.g., sidelink device) that may be used in conjunction with scheduling the wireless communication device 704 to relay data between the scheduling entity and another wireless communication device 706 according to some aspects of the first example. The wireless communication devices 704 and 706 may correspond to any of the UEs, sidelink devices, D2D devices, V2X devices, or scheduled entities shown in any of FIGS. 1, 3, 4, and 8-14. The scheduling entity 702 may correspond to any of the base stations or scheduling entities shown in any of FIGS. 1, 3, 4, 8-13, and 17.

At 708 of FIG. 7, the wireless communication device 704 may send a relaying parameter to the scheduling entity 702. For example, the relaying parameter may indicate the number of data packets that the wireless communication device 704 can buffer and/or relay. In some examples, the wireless communication device 704 may calculate this relaying parameter based on its available resources (e.g., hardware resources) and the amount of these resources that the wireless communication device 704 reserves for operations (e.g., data transmission and/or reception) that have a higher priority (e.g., for the wireless communication device 704) than relaying operations. Thus, in some aspects, this relaying parameter may change over time. Consequently, the wireless communication device 704 may repeatedly signal this relaying parameter (e.g., as it changes). As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 710, the scheduling entity 702 schedules a relaying operation for the wireless communication device 704 based on the relaying parameter received at 708. For example, based on a constraint indicated by the relaying parameter, the scheduling entity may specify (e.g., limit) the number of resources allocated for a relaying operation that uses the wireless communication device 704 as a relay.

At 712, the scheduling entity 702 transmits scheduling information (e.g., a grant specifying allocated time/frequency resource) for the relaying operation to the wireless communication device 704 and the wireless communication device 706.

At 714, the wireless communication device 704 may then relay data between the scheduling entity 702 and the wireless communication device 706 according to the scheduling information. For example, the wireless communication device 704 may receive data from the wireless communication device 706 on resources specified by the scheduling information and transmit this data to the scheduling entity 702 on resources specified by the scheduling information. Alternatively, or in addition, the wireless communication device 704 may receive data from the scheduling entity 702 on resources specified by the scheduling information and transmit this data to the wireless communication device 706 on resources specified by the scheduling information.

In a second example, a wireless communication device may signal a relaying parameter that indicates a switching time for the wireless communication device to switch from a first type of relaying to a second type of relaying. The different types of relaying may include, for example, decode and forward (DF) relaying, amplify and forward (AF) relaying, and compress and forward (CF) relaying. Other or additional types of relaying may be supported in other examples. Thus, in some examples, a wireless communication device may indicate the amount of time it takes the wireless communication device to switch from DF relaying to AF relaying, or vice versa.

In some examples, different types of relaying may be associated with different reliabilities. Thus, a scheduling entity may schedule a relaying type associated with a higher reliability for with applications with higher reliability and/or quality-of-service (QoS) requirements.

Once the wireless communication device reports its switching time, a scheduling entity (e.g., gNB or monitoring UE) may, based on service quality, assign resources for a given relaying request to the wireless communication device. For example, the scheduling entity may schedule a first set of resources for a first type of relaying and schedule a second set of resources for a second type of relaying. In addition, there may be a time gap between these scheduled resources to account for the switching time.

Figure 8:
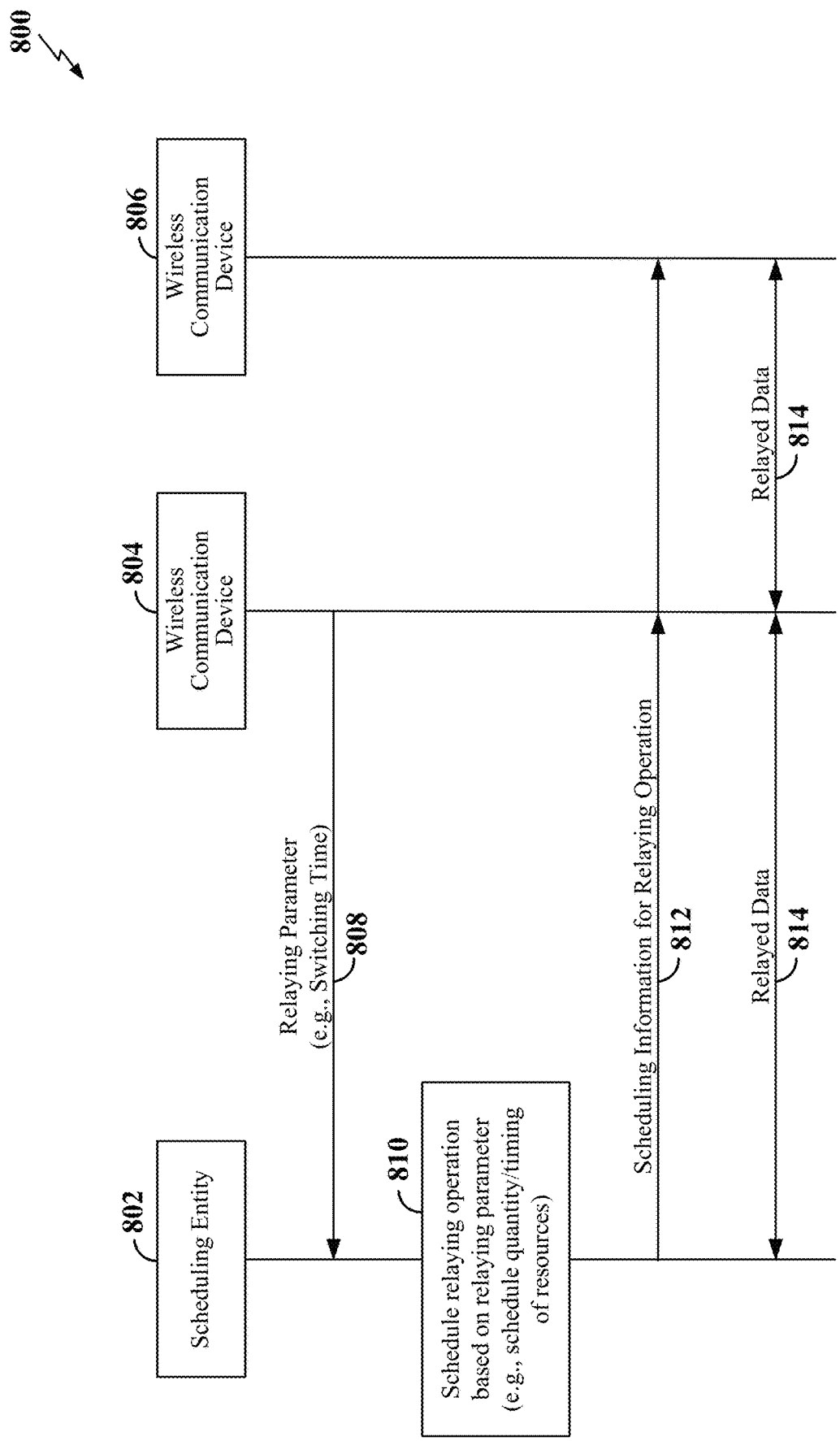
FIG. 8 is a signaling diagram illustrating an example of signaling an indication of a switching time for a wireless communication device to switch from a first type of relaying to a second type of relaying according to some aspects.

FIG. 8 is a signaling diagram illustrating an example of signaling between a scheduling entity 802 (e.g., a base station) and a wireless communication device 804 (e.g., sidelink device) that may be used in conjunction with scheduling the wireless communication device 804 to relay data between the scheduling entity and another wireless communication device 806 according to some aspects of the second example. The wireless communication devices 804 and 806 may correspond to any of the UEs, sidelink devices, D2D devices, V2X devices, or scheduled entities shown in any of FIGS. 1, 3, 4, 7, and 9-14. The scheduling entity 802 may correspond to any of the base stations or scheduling entities shown in any of FIGS. 1, 3, 4, 7, 9-13, and 17.

At 808 of FIG. 8, the wireless communication device 804 may send a relaying parameter to the scheduling entity 802. For example, the relaying parameter may indicate the switching time for the wireless communication device 804. In some examples, this switching time may be a fixed parameter (e.g., stored in a memory). In some examples, this switching time may be a configurable parameter (e.g., configured by a network). As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 810, the scheduling entity 802 schedules a relaying operation for the wireless communication device 804 based on the relaying parameter received at 808. For example, based on a time constraint indicated by the relaying parameter, the scheduling entity may specify that the resources allocated for different types of relaying operations are separate in time by an amount of time that is based on the relaying parameter. In addition, the scheduling entity may specify the number of resources allocated for the different types of relaying operations.

At 812, the scheduling entity 802 transmits scheduling information (e.g., a grant specifying allocated time/frequency resource) for the relaying operation to the wireless communication device 804 and the wireless communication device 806.

At 814, the wireless communication device 804 may then relay data between the scheduling entity 802 and the wireless communication device 806 according to the scheduling information. For example, the wireless communication device 804 may receive data from the wireless communication device 806 on resources specified by the scheduling information and transmit this data to the scheduling entity 802 on resources specified by the scheduling information. Alternatively, or in addition, the wireless communication device 804 may receive data from the scheduling entity 802 on resources specified by the scheduling information and transmit this data to the wireless communication device 806 on resources specified by the scheduling information.

In a third example, a wireless communication device may signal a relaying parameter that indicates how many concurrent relaying operations a wireless communication device supports and, optionally, the relaying type(s) of the concurrent relaying operations. For example, if the wireless communication device supports different relaying types and services at the same time, where each relaying type is associated with a service, the wireless communication device may signal an indication of how many of each relaying type it can support at a given time. For example, the wireless communication device could support 3 DF (type 1 relaying) packets and 2 AF (type 2 relaying) packets. Other examples are possible.

Figure 9:
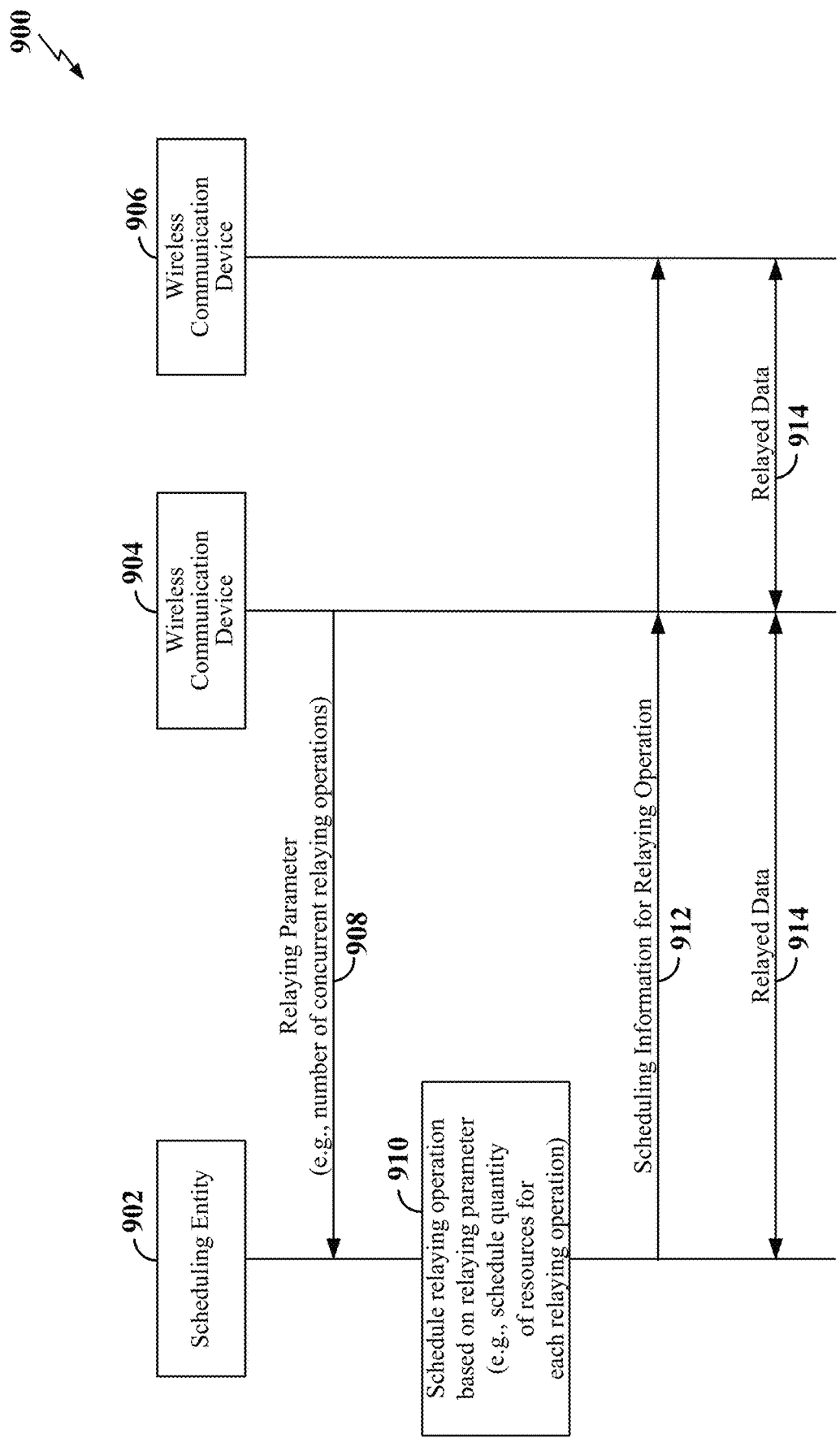
FIG. 9 is a signaling diagram illustrating an example of signaling a concurrent relaying capability of a wireless communication device according to some aspects.

FIG. 9 is a signaling diagram illustrating an example of signaling between a scheduling entity 902 (e.g., a base station) and a wireless communication device 904 (e.g., sidelink device) that may be used in conjunction with scheduling the wireless communication device 904 to relay data between the scheduling entity and another wireless communication device 906 according to some aspects of the third example. The wireless communication devices 904 and 906 may correspond to any of the UEs, sidelink devices, D2D devices, V2X devices, or scheduled entities shown in any of FIGS. 1, 3, 4, 7, 8, and 10-14. The scheduling entity 902 may correspond to any of the base stations or scheduling entities shown in any of FIGS. 1, 3, 4, 7, 8, 10-13, and 17.

At 908 of FIG. 9, the wireless communication device 904 may send a relaying parameter to the scheduling entity 902. For example, the relaying parameter may indicate the number of concurrent relaying operations that the wireless communication device 904 can support. In some examples, this number may be a fixed parameter (e.g., stored in a memory). In some examples, this number may be a configurable parameter (e.g., configured by a network). As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 910, the scheduling entity 902 schedules a relaying operation for the wireless communication device 904 based on the relaying parameter received at 908. For example, based on a constraint indicated by the relaying parameter, the scheduling entity may specify (e.g., limit) the number of resources allocated for concurrent relaying operations that use the wireless communication device 904 as a relay.

At 912, the scheduling entity 902 transmits scheduling information (e.g., a grant specifying allocated time/frequency resource) for the relaying operation to the wireless communication device 904 and the wireless communication device 906.

At 914, the wireless communication device 904 may then relay data between the scheduling entity 902 and the wireless communication device 906 according to the scheduling information. For example, the wireless communication device 904 may receive data from the wireless communication device 906 on resources specified by the scheduling information and transmit this data to the scheduling entity 902 on resources specified by the scheduling information. Alternatively, or in addition, the wireless communication device 904 may receive data from the scheduling entity 902 on resources specified by the scheduling information and transmit this data to the wireless communication device 906 on resources specified by the scheduling information.

In a fourth example, a wireless communication device may signal a relaying parameter that indicates a period of time that the wireless communication device does not perform relaying. For example, the wireless communication device may request a resting/halting time associated with abstaining from performing relaying for a certain preselected duration. Thus, at those times, the wireless communication device does not participate in any relaying activity.

This resting/halting time may be requested due to battery limitation, due to the wireless communication device being busy servicing other higher priority transmissions or relaying, or any other limitations. Once this resting/halting request is signaled to other devices (e.g., a UE or a gNB), and after the specified duration ends (e.g., a timer could be used to track the duration), the wireless communication device may again be used for relaying operations.

Figure 10:
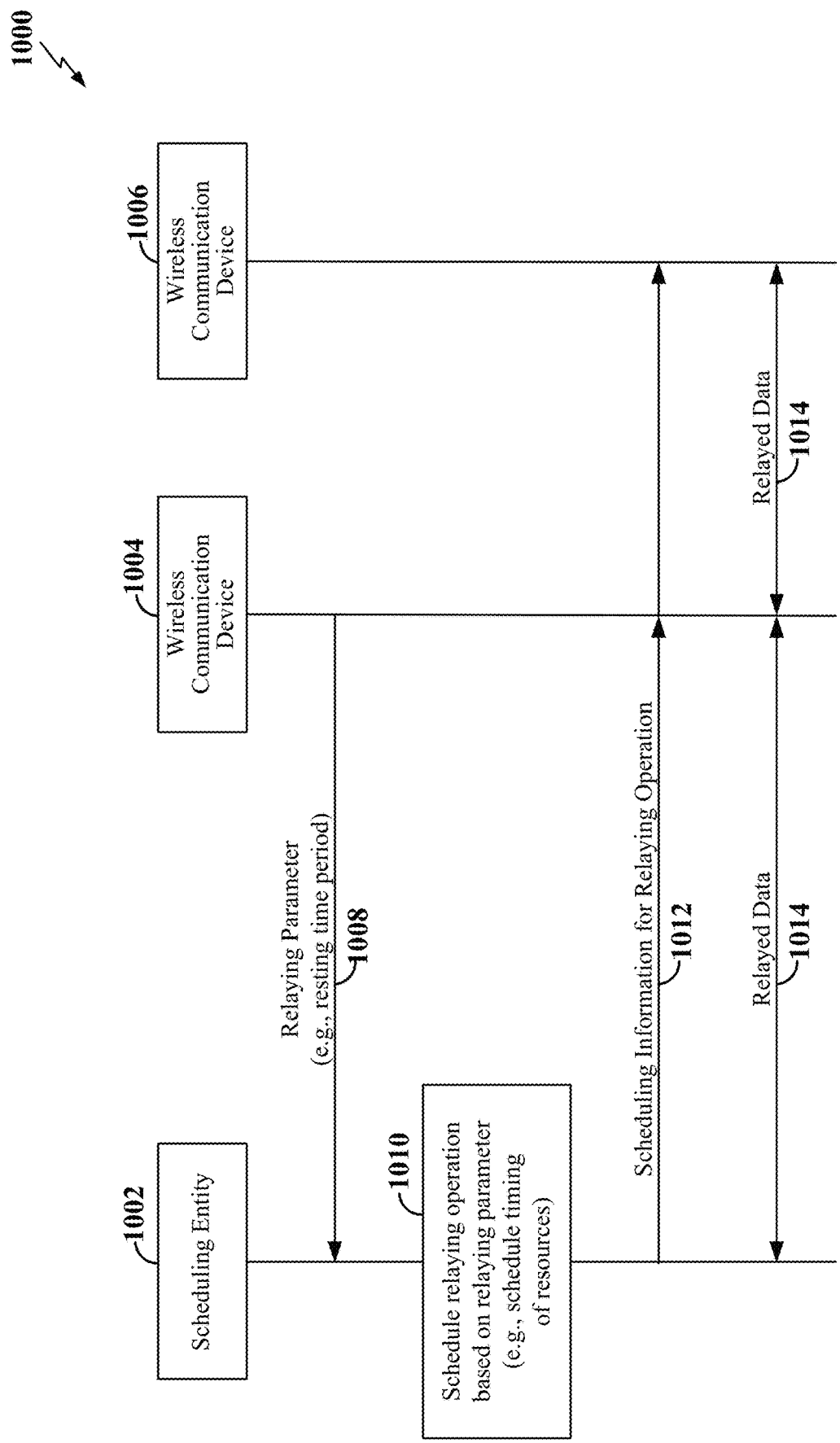
FIG. 10 is a signaling diagram illustrating an example of signaling an indication of a period of time that a wireless communication device does not perform relaying according to some aspects.

FIG. 10 is a signaling diagram illustrating an example of signaling between a scheduling entity 1002 (e.g., a base station) and a wireless communication device 1004 (e.g., sidelink device) that may be used in conjunction with scheduling the wireless communication device 1004 to relay data between the scheduling entity and another wireless communication device 1006 according to some aspects of the fourth example. The wireless communication devices 1004 and 1006 may correspond to any of the UEs, sidelink devices, D2D devices, V2X devices, or scheduled entities shown in any of FIGS. 1, 3, 4, 7-9, and 11-14. The scheduling entity 1002 may correspond to any of the base stations or scheduling entities shown in any of FIGS. 1, 3, 4, 7-9, 11-13, and 17.

At 1008 of FIG. 10, the wireless communication device 1004 may send a relaying parameter to the scheduling entity 1002. For example, the relaying parameter may indicate a resting/halting time period for the wireless communication device 1004. In some examples, the wireless communication device 1004 may calculate this relaying parameter based on its available resources (e.g., hardware resources) and/or other factors. Thus, in some aspects, this relaying parameter may change over time (e.g., the start time and/or the duration of the resting/halting time period). Consequently, the wireless communication device 1004 may repeatedly signal this relaying parameter (e.g., as it changes). As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 1010, the scheduling entity 1002 schedules a relaying operation for the wireless communication device 1004 based on the relaying parameter received at 1008. For example, based on a constraint indicated by the relaying parameter, the scheduling entity may determine when to allocate resources for a relaying operation that uses the wireless communication device 1004 as a relay.

At 1012, the scheduling entity 1002 transmits scheduling information (e.g., a grant specifying allocated time/frequency resource) for the relaying operation to the wireless communication device 1004 and the wireless communication device 1006.

At 1014, the wireless communication device 1004 may then relay data between the scheduling entity 1002 and the wireless communication device 1006 according to the scheduling information. For example, the wireless communication device 1004 may receive data from the wireless communication device 1006 on resources specified by the scheduling information and transmit this data to the scheduling entity 1002 on resources specified by the scheduling information. Alternatively, or in addition, the wireless communication device 1004 may receive data from the scheduling entity 1002 on resources specified by the scheduling information and transmit this data to the wireless communication device 1006 on resources specified by the scheduling information.

In a fifth example, a wireless communication device may signal a relaying parameter that indicates a relaying duplexing capability of the wireless communication device (e.g., whether the relaying device supports full/half duplex relaying). For example, in some scenarios, a wireless communication device may signal its full-duplex capability for relaying packets. In other scenarios, however, the wireless communication device may elect to not use its full-duplex capability for relaying packets. Thus, the wireless communication device may signal a half-duplex capability for relaying packets in some scenarios.

Figure 11:
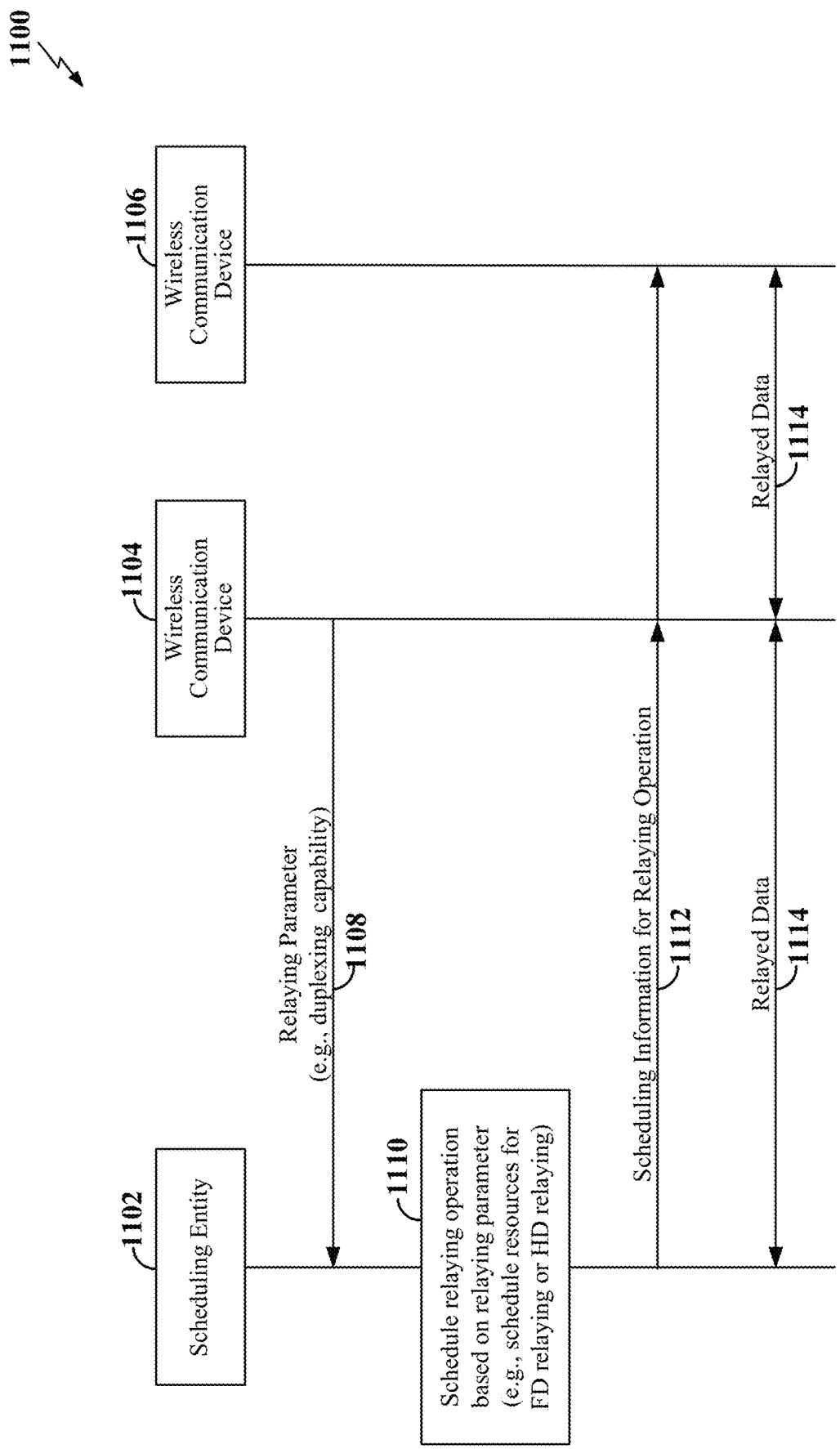
FIG. 11 is a signaling diagram illustrating an example of signaling a relaying duplexing capability of a wireless communication device according to some aspects.

FIG. 11 is a signaling diagram illustrating an example of signaling between a scheduling entity 1102 (e.g., a base station) and a wireless communication device 1104 (e.g., sidelink device) that may be used in conjunction with scheduling the wireless communication device 1104 to relay data between the scheduling entity and another wireless communication device 1106 according to some aspects of the fifth example. The wireless communication devices 1104 and 1106 may correspond to any of the UEs, sidelink devices, D2D devices, V2X devices, or scheduled entities shown in any of FIGS. 1, 3, 4, 11-10, and 12-14. The scheduling entity 1102 may correspond to any of the base stations or scheduling entities shown in any of FIGS. 1, 3, 4, 7-10, 12-13, and 17.

At 1108 of FIG. 11, the wireless communication device 1104 may send a relaying parameter to the scheduling entity 1102. For example, the relaying parameter may indicate the duplexing capability currently supported by the wireless communication device 1104. In some examples, the wireless communication device 1004 may determine relaying parameter based on its available resources (e.g., hardware resources) and/or other factors (e.g., full-duplexing may be reserved for higher priority transmission/receptions). Thus, in some aspects, this relaying parameter may change over time (e.g., switching between half-duplex and full-duplex). Consequently, the wireless communication device 1104 may repeatedly signal this relaying parameter (e.g., as it changes). As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 1110, the scheduling entity 1102 schedules a relaying operation for the wireless communication device 1104 based on the relaying parameter received at 1108. For example, based on a constraint indicated by the relaying parameter, the scheduling entity may determine whether to allocate full-duplex or half-duplex resources for a relaying operation that uses the wireless communication device 1104 as a relay.

At 1112, the scheduling entity 1102 transmits scheduling information (e.g., a grant specifying allocated time/frequency resource) for the relaying operation to the wireless communication device 1104 and the wireless communication device 1106.

At 1114, the wireless communication device 1104 may then relay data between the scheduling entity 1102 and the wireless communication device 1106 according to the scheduling information. For example, the wireless communication device 1104 may receive data from the wireless communication device 1106 on resources specified by the scheduling information and transmit this data to the scheduling entity 1102 on resources specified by the scheduling information. Alternatively, or in addition, the wireless communication device 1104 may receive data from the scheduling entity 1102 on resources specified by the scheduling information and transmit this data to the wireless communication device 1106 on resources specified by the scheduling information.

In a sixth example, a wireless communication device may signal a relaying parameter that indicates a relaying condition (e.g., requirement) of the wireless communication device (e.g., resources, reliability, data rate, throughput, or error rate requested by the wireless communication device). For example, a wireless communication device may signal the number of resources needed on average (in number of REs) for the wireless communication device to support a relaying operation. This amount could be given, as extra resources, before or after the wireless communication device performs a relaying operation. In some examples, the wireless communication device may request a certain level of reliability and data rates, measured in throughput or BLER, for relaying.

Figure 12:
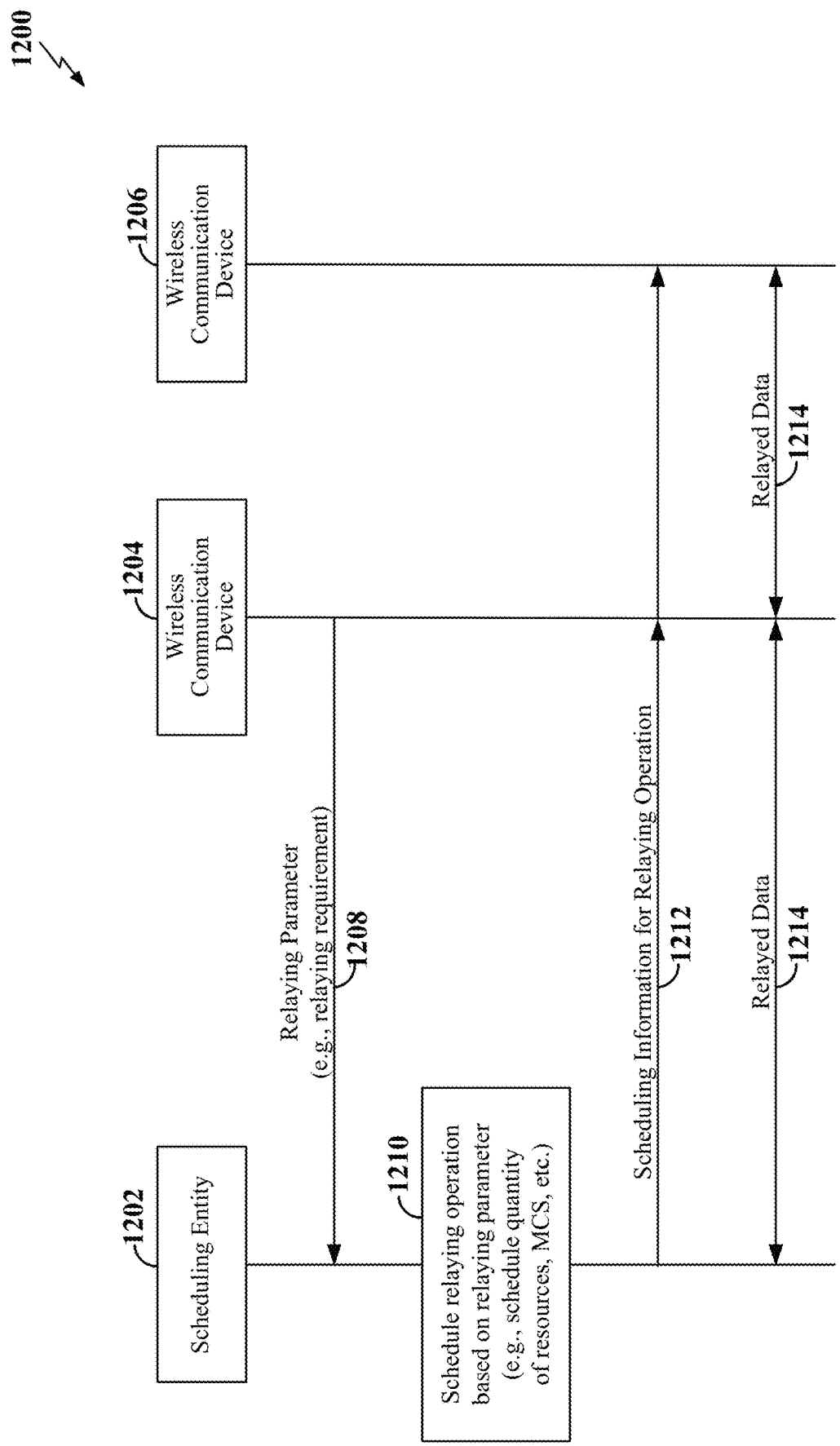
FIG. 12 is a signaling diagram illustrating an example of signaling relaying conditions of a wireless communication device according to some aspects.

FIG. 12 is a signaling diagram illustrating an example of signaling between a scheduling entity 1202 (e.g., a base station) and a wireless communication device 1204 (e.g., sidelink device) that may be used in conjunction with scheduling the wireless communication device 1204 to relay data between the scheduling entity and another wireless communication device 1206 according to some aspects of the sixth example. The wireless communication devices 1204 and 1206 may correspond to any of the UEs, sidelink devices, D2D devices, V2X devices, or scheduled entities shown in any of FIGS. 1, 3, 4, 7-11, and 13-14. The scheduling entity 1202 may correspond to any of the base stations or scheduling entities shown in any of FIGS. 1, 3, 4, 7-11, 13, and 17.

At 1208 of FIG. 12, the wireless communication device 1204 may send a relaying parameter to the scheduling entity 1202. For example, the relaying parameter may indicate a relaying condition of the wireless communication device 1204. In some examples, the wireless communication device 1204 may determine the relaying parameter based on its available resources (e.g., hardware resources) and/or other factors. Thus, in some aspects, this relaying parameter may change over time. As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 1210, the scheduling entity 1202 schedules a relaying operation for the wireless communication device 1204 based on the relaying parameter received at 1208. For example, based on a constraint indicated by the relaying parameter, the scheduling entity may specify the resources, MCS, etc., allocated for a relaying operation that uses the wireless communication device 1204 as a relay.

At 1212, the scheduling entity 1202 transmits scheduling information (e.g., a grant specifying allocated time/frequency resource) for the relaying operation to the wireless communication device 1204 and the wireless communication device 1206.

At 1214, the wireless communication device 1204 may then relay data between the scheduling entity 1202 and the wireless communication device 1206 according to the scheduling information. For example, the wireless communication device 1204 may receive data from the wireless communication device 1206 on resources specified by the scheduling information and transmit this data to the scheduling entity 1202 on resources specified by the scheduling information. Alternatively, or in addition, the wireless communication device 1204 may receive data from the scheduling entity 1202 on resources specified by the scheduling information and transmit this data to the wireless communication device 1206 on resources specified by the scheduling information.

In a seventh example, a wireless communication device may signal a relaying parameter that indicates energy harvesting information for the wireless communication device (e.g., the amount of energy needed to be harvested for a relaying operation). For example, if the wireless communication device is an energy-harvesting (EH) node, the wireless communication device may signal the amount of energy needed to be harvested (paid/provided by the network or network UEs/gNB s) per relaying packet (or per relaying transmission). As another example, the wireless communication device may signal the amount of energy to start the relaying process, and the duration to be considered as a potential relay node.

Figure 13:
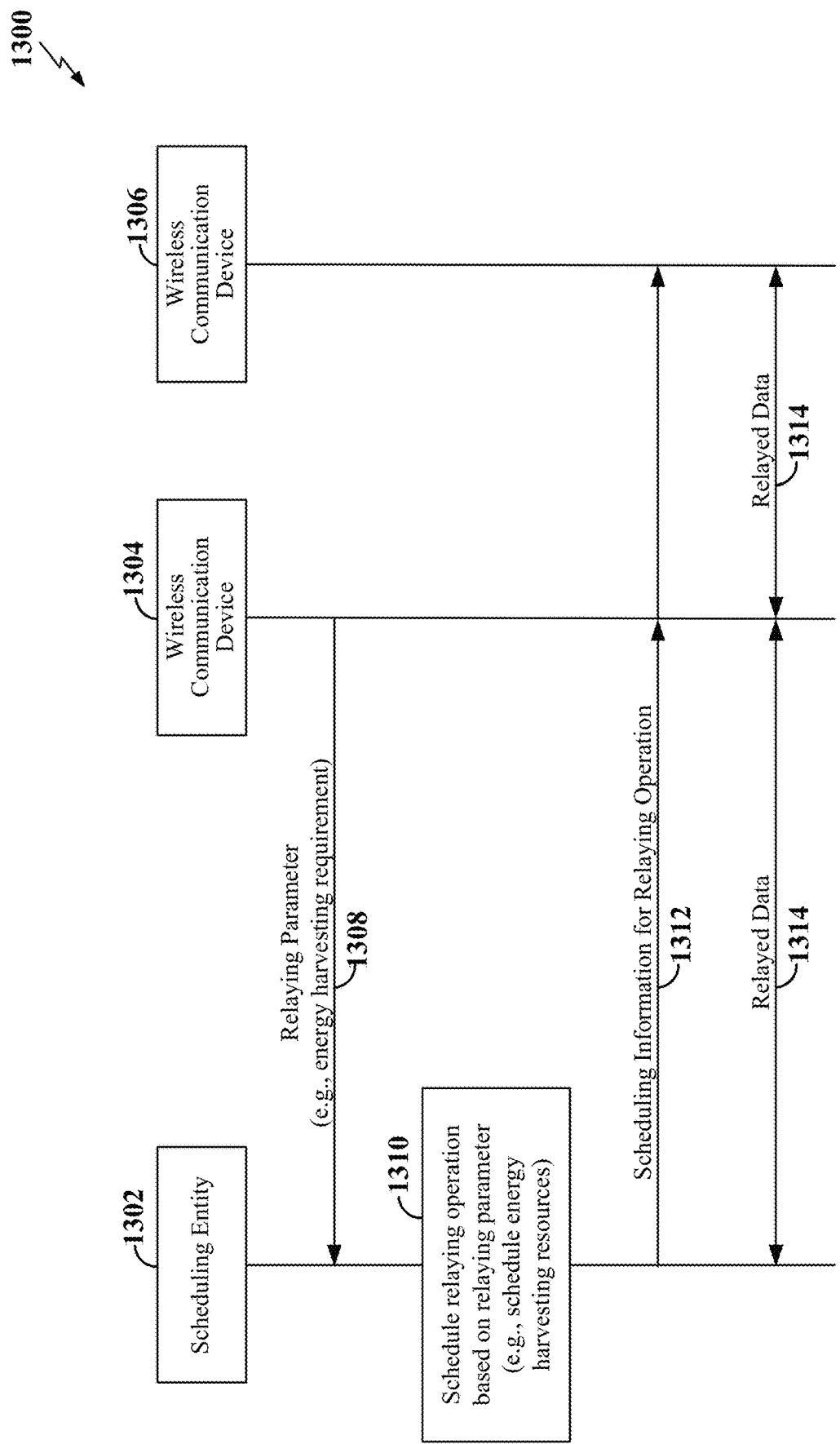
FIG. 13 is a signaling diagram illustrating an example of signaling energy harvesting information for a wireless communication device according to some aspects.

FIG. 13 is a signaling diagram illustrating an example of signaling between a scheduling entity 1302 (e.g., a base station) and a wireless communication device 1304 (e.g., sidelink device) that may be used in conjunction with scheduling the wireless communication device 1304 to relay data between the scheduling entity and another wireless communication device 1306 according to some aspects of the seventh example. The wireless communication devices 1304 and 1306 may correspond to any of the UEs, sidelink devices, D2D devices, V2X devices, or scheduled entities shown in any of FIGS. 1, 3, 4, 7-12, and 14. The scheduling entity 1302 may correspond to any of the base stations or scheduling entities shown in any of FIGS. 1, 3, 4, 7-12, and 17.

At 1308 of FIG. 13, the wireless communication device 1304 may send a relaying parameter to the scheduling entity 1302. For example, the relaying parameter may indicate energy harvesting information for the wireless communication device 1304 As discussed herein, the relaying parameter may be sent via a Uu interface (e.g., in a MAC-CE, an RRC message, or a dedicated PUCCH), via a sidelink interface (e.g., in a MAC-CE, an RRC message, or a dedicated PSCCH), or via some other type of signaling.

At 1310, the scheduling entity 1302 schedules a relaying operation for the wireless communication device 1304 based on the relaying parameter received at 1308. For example, based on a constraint indicated by the relaying parameter, the scheduling entity may specify energy harvesting resources for a relaying operation that uses the wireless communication device 1304 as a relay.

At 1312, the scheduling entity 1302 transmits scheduling information (e.g., a grant specifying allocated time/frequency resource) for the relaying operation to the wireless communication device 1304 and the wireless communication device 1306.

At 1314, the wireless communication device 1304 may then relay data between the scheduling entity 1302 and the wireless communication device 1306 according to the scheduling information. For example, the wireless communication device 1304 may receive data from the wireless communication device 1306 on resources specified by the scheduling information and transmit this data to the scheduling entity 1302 on resources specified by the scheduling information. Alternatively, or in addition, the wireless communication device 1304 may receive data from the scheduling entity 1302 on resources specified by the scheduling information and transmit this data to the wireless communication device 1306 on resources specified by the scheduling information.

Figure 14:
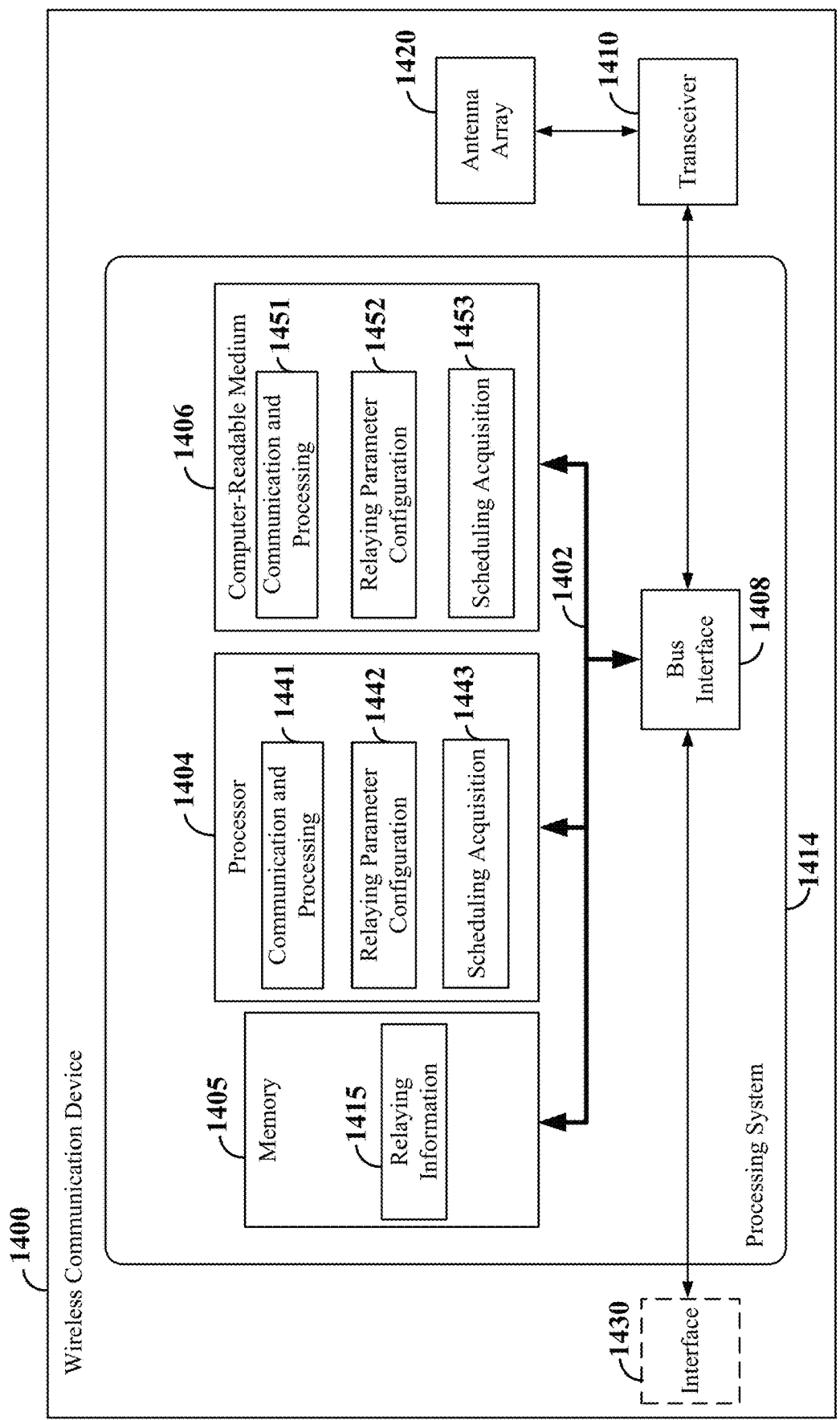
FIG. 14 is a block diagram illustrating an example of a hardware implementation for a wireless communication device employing a processing system according to some aspects.

FIG. 14 is a conceptual diagram illustrating an example of a hardware implementation for a wireless communication device 1400 employing a processing system 1414. For example, the wireless communication device 1400 may be a UE, a sidelink device, a D2D device, a V2X device, or a scheduled entity as illustrated in any of FIGS. 1, 3, 4, and 7-13.

In accordance with various aspects of the disclosure, an element, or any portion of an element, or any combination of elements may be implemented with the processing system 1414. The processing system 1414 may include one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1400 may be configured to perform any one or more of the functions described herein. That is, the processor 1404, as utilized in a wireless communication device 1400, may be used to implement any one or more of the methods described herein.

The processor 1404 may in some instances be implemented via a baseband or modem chip and in other implementations, the processor 1404 may itself include a number of devices distinct and different from a baseband or modem chip (e.g., in such scenarios these devices may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410 and an antenna array 1420 and between the bus 1402 and an interface 1430. The transceiver 1410 provides a means for communicating with various other apparatus over a transmission medium (e.g., air interface). The interface 1430 provides a communication interface or means of communicating with various other apparatuses and devices (e.g., other devices housed within the same apparatus as the wireless communication device 1400 or other external apparatuses) over an internal bus or external transmission medium. Depending upon the nature of the wireless communication device 1400, the interface 1430 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store relaying information 1415 (e.g., relay parameters) used by the processor 1404 in cooperation with the transceiver 1410 to control relaying operations as described herein.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. In some examples, the computer-readable medium 1406 may be part of the memory 1405. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. In some aspects, processor 1404 may include circuitry for performing one or more of the operations described herein with respect to FIGS. 6-13 and 15-16.

The processor 1404 may include communication and processing circuitry 1441, configured to communicate with a base station and one or more other wireless communication devices over a common carrier shared between a cellular (e.g., Uu) interface and a sidelink (e.g., PC5) interface. In some examples, the communication and processing circuitry 1441 may include one or more hardware components that provide the physical structure that performs processes related to wireless communication (e.g., signal reception and/or signal transmission) and signal processing (e.g., processing a received signal and/or processing a signal for transmission). The communication and processing circuitry 1441 may further be configured to execute communication and processing software 1451 stored on the computer-readable medium 1406 to implement one or more functions described herein.

In some implementations where the communication involves receiving information, the communication and processing circuitry 1441 may obtain information from a component of the wireless communication device 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, SCIs, feedback, other information, or any combination thereof. In some examples, the communication and processing circuitry 1441 may receive information via one or more of a PSCCH, a PSSCH, a PSFCH, some other type of channel, or any combination thereof. In some examples, the communication and processing circuitry 1441 may include functionality for a means for receiving (e.g., means for receiving a signal and/or means for receiving control information). In some examples, the communication and processing circuitry 1441 may include functionality for a means for decoding.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, SCIs, feedback, other information, or any combination thereof. In some examples, the communication and processing circuitry 1441 may send information via one or more of a PSCCH, a PSSCH, a PSFCH, some other type of channel, or any combination thereof. In some examples, the communication and processing circuitry 1441 may include functionality for a means for sending (e.g., means for transmitting). In some examples, the communication and processing circuitry 1441 may include functionality for a means for encoding.

The processor 1404 may further include relaying parameter configuration circuitry 1442, configured to perform one or more of the relaying parameter configuration-related operations described herein (e.g., including those described in conjunction with FIGS. 6-13). In some examples, the relaying parameter configuration circuitry 1442 may include functionality for a means for transmitting a relaying parameter. For example, the relaying parameter configuration circuitry 1442 may cooperate with the communication and processing circuitry 1441 to transmit a relaying parameter to a scheduling entity or some other wireless communication device via a media access control-control element (MAC-CE) over a Uu interface, a radio resource control (RRC) message over a Uu interface, a physical uplink channel (PUCCH) over a Uu interface, a sidelink MAC-CE, a sidelink RRC message, a physical sidelink control channel (PSCCH), or a combination thereof. The relaying parameter configuration circuitry 1442 may further be configured to execute relaying parameter configuration software 1452 stored on the computer-readable medium 1406 to implement one or more functions described herein.

The processor 1404 may further include scheduling acquisition circuitry 1443, configured to perform one or more of the scheduling acquisition-related operations described herein (e.g., including those described in conjunction with FIGS. 6-13). In some examples, the scheduling acquisition circuitry 1443 may include functionality for a means for receiving scheduling information. For example, the scheduling acquisition circuitry 1443 may cooperate with the communication and processing circuitry 1441 to receive a PDCCH or a PSCCH that specifies resources for a relay operation. In some examples, the scheduling acquisition circuitry 1443 may include functionality for a means for relaying data according to the scheduling information. For example, the scheduling acquisition circuitry 1443 may cooperate with the communication and processing circuitry 1441 to receive data via a first PSSCH and relay the data via a second PSSCH. As another example, the scheduling acquisition circuitry 1443 may cooperate with the communication and processing circuitry 1441 to receive data via a PDSCH and relay the data via a PSSCH. As a further example, the scheduling acquisition circuitry 1443 may cooperate with the communication and processing circuitry 1441 to receive data via a PSSCH and relay the data via a PUSCH. The scheduling acquisition circuitry 1443 may further be configured to execute scheduling acquisition software 1453 stored on the computer-readable medium 1406 to implement one or more functions described herein.

Figure 15:
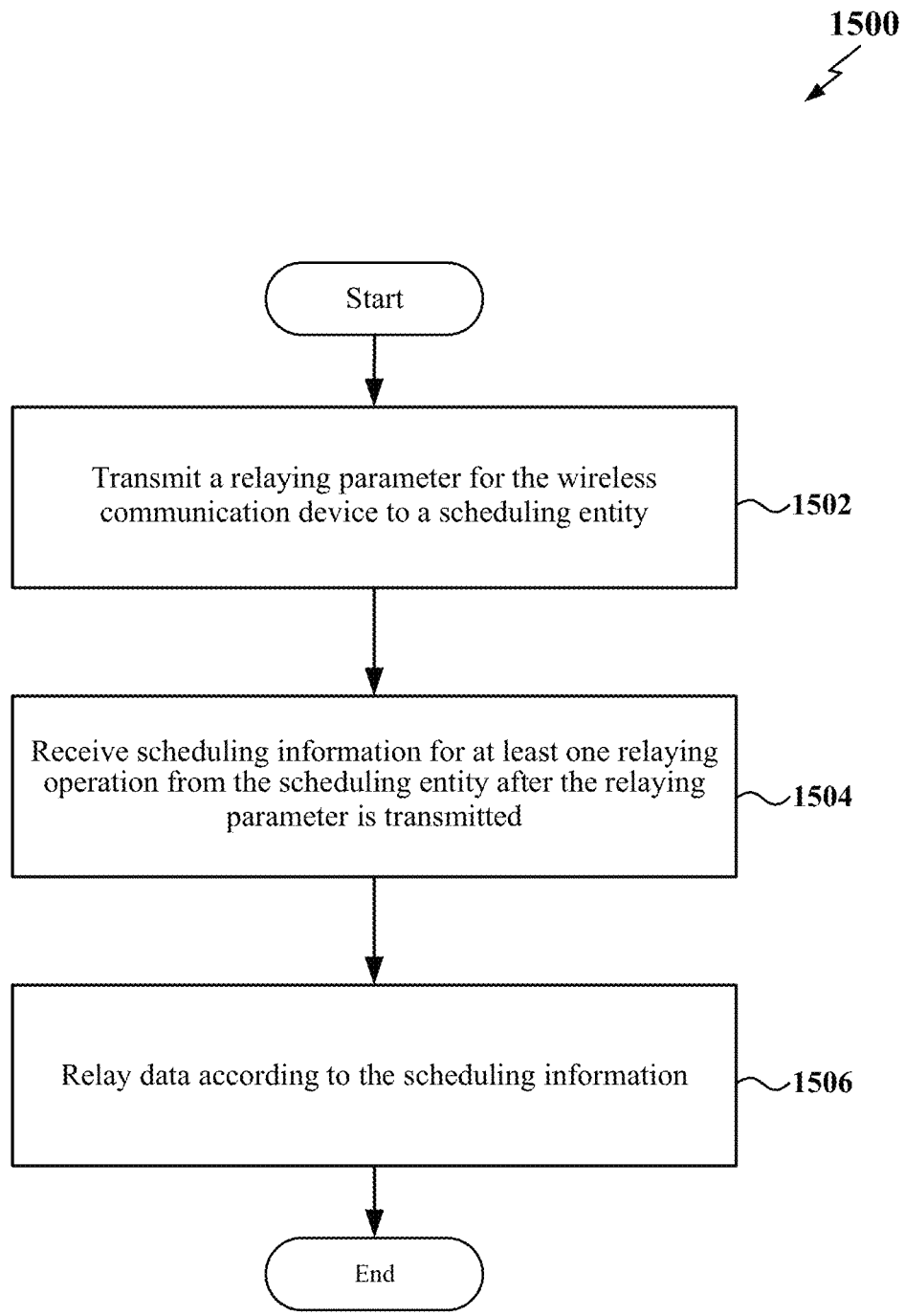
FIG. 15 is a flow chart of an example method for indicating a relaying parameter for a wireless communication device according to some aspects.

FIG. 15 is a flow chart of a method 1500 for a wireless communication device according to some aspects. As described below, some or all illustrated features may be omitted in a particular implementation within the scope of the present disclosure, and some illustrated features may not be required for implementation of all examples. In some examples, the method 1500 may be performed by the wireless communication device 1400 (e.g., performed by the processing system 1414), as described above and illustrated in FIG. 14, by a processor or processing system, or by any suitable means for carrying out the described functions.

At block 1502, a wireless communication device may transmit a relaying parameter for the wireless communication device to a scheduling entity. For example, the relaying parameter configuration circuitry 1442 in cooperation with the communication and processing circuitry 1441 and the transceiver 1410, shown and described above in connection with FIG. 14, may provide a means to transmit the relaying parameter in a message sent on a resource scheduled for the wireless communication device by a scheduling entity. In some examples, transmitting the relaying parameter may include transmitting the relaying parameter via at least one of: a media access control-control element (MAC-CE) over a base station air interface, a radio resource control (RRC) message over the base station air interface, a physical uplink channel (PUCCH) over the base station air interface, a sidelink MAC-CE, a sidelink RRC message, a physical sidelink control channel (PSCCH), or a combination thereof.

In some examples, the relaying parameter may include an indication of an amount of data that the wireless communication device is capable of relaying. In some examples, the relaying parameter may include an indication of an amount of data that the wireless communication device is capable of buffering for relaying.

In some examples, the relaying parameter may include switching time information associated with a switch by the wireless communication device from a first type of relaying to a second type of relaying, where the second type of relaying is different from the first type of relaying.

In some examples, the relaying parameter may include an indication of a quantity of concurrent relaying operations supported by the wireless communication device. In some examples, the quantity of concurrent relaying operations may include at least one of: a first quantity of concurrent relaying operations for a first type of relaying, a second quantity of concurrent relaying operations for a second type of relaying, or a combination thereof.

In some examples, the relaying parameter may include an indication of a period of time during which the wireless communication device does not perform relaying. In some examples, the method 1500 may further include determining a limitation of the wireless communication device and selecting the period of time based on the limitation.

In some examples, the relaying parameter may include a relaying condition. In some examples, the relaying condition may include at least one of: a quantity of resources, a level of reliability, a data rate, a throughput, an error rate, or a combination thereof. In some examples, the relaying parameter may include a relaying duplexing capability of the wireless communication device.

In some examples, the relaying parameter may include an energy harvesting parameter. In some examples, the energy harvesting parameter may include at least one of: an amount of energy to be harvested by the wireless communication device, an amount of harvested energy required to commence relaying, a relaying duration associated with energy harvesting, or a combination thereof.

At block 1504, the wireless communication device may receive scheduling information for at least one relaying operation from the scheduling entity after the relaying parameter is transmitted. For example, the scheduling acquisition circuitry 1443 in cooperation with the communication and processing circuitry 1441 and the transceiver 1410, shown and described above in connection with FIG. 14, may provide a means to receive a PDCCH or a PSCCH that specifies resources for a relay operation.

At block 1506, the wireless communication device may relay data according to the scheduling information. For example, the scheduling acquisition circuitry 1443 in cooperation with the communication and processing circuitry 1441 and the transceiver 1410 may provide a means to receive data via a first PSSCH and relay the data via a second PSSCH, or to receive data via a PDSCH and relay the data via a PSSCH, or to receive data via a PSSCH and relay the data via a PUSCH.

In some example, the method 1500 may further include determining at least one of a power capability of the wireless communication device or a hardware capability of the wireless communication device. In some example, the method 1500 may further include selecting the relaying parameter based on the power capability or the hardware capability.

Figure 16:
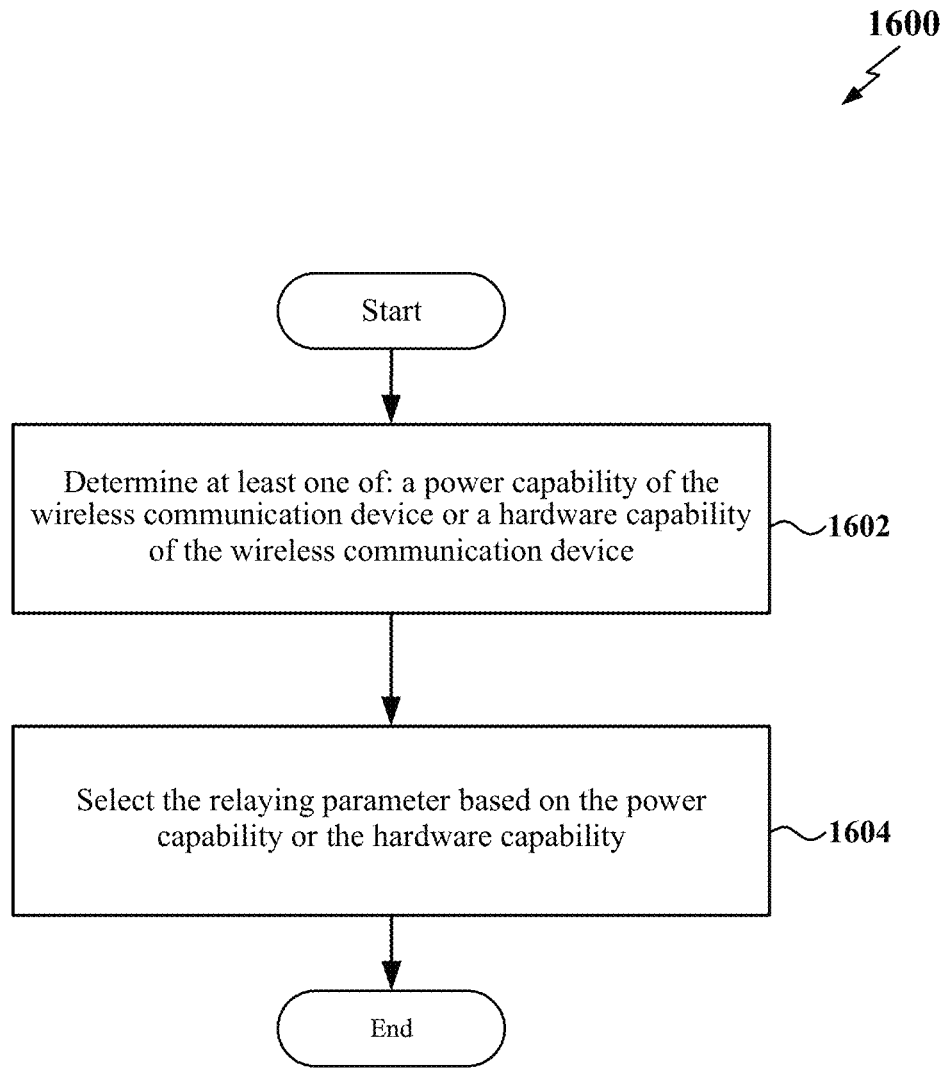
FIG. 16 is a flow chart of an example method for selecting a relaying parameter for a wireless communication device according to some aspects.

FIG. 16 is a flow chart of a method 1600 for a wireless communication device according to some aspects. As described below, some or all illustrated features may be omitted in a particular implementation within the scope of the present disclosure, and some illustrated features may not be required for implementation of all examples. In some examples, the method 1600 may be performed by the wireless communication device 1400 (e.g., performed by the processing system 1414), as described above and illustrated in FIG. 14, by a processor or processing system, or by any suitable means for carrying out the described functions.

At block 1602, a wireless communication device may determine at least one of: a power capability of the wireless communication device or a hardware capability of the wireless communication device. For example, the relaying parameter configuration circuitry 1442 may provide a means to retrieve capability information of the wireless communication device from the memory 1405.

At block 1604, the wireless communication device may select the relaying parameter based on the power capability or the hardware capability. For example, the relaying parameter configuration circuitry 1442 may provide a means to specify a relaying parameter indicating that the wireless communication device supports a lower level of relay traffic if the wireless communication device has very limited power capability and/or very limited hardware capability. Conversely, the relaying parameter configuration circuitry 1442 may provide a means to specify a relaying parameter indicating that the wireless communication device supports a higher level of relay traffic if the wireless communication device has more power capability and/or more hardware capability.

Figure 17:
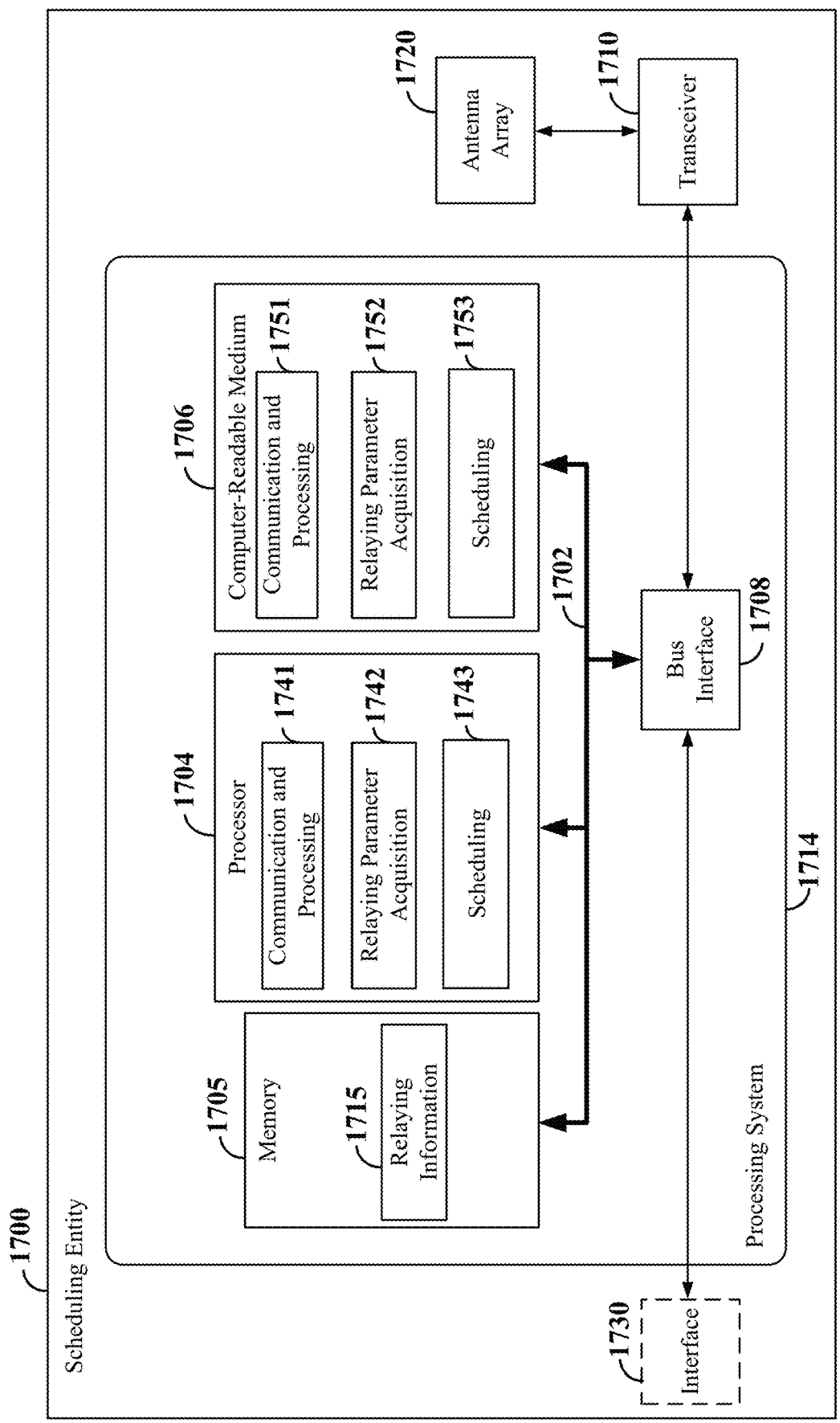
FIG. 17 is a block diagram illustrating an example of a hardware implementation for a scheduling entity employing a processing system according to some aspects.

FIG. 17 is a conceptual diagram illustrating an example of a hardware implementation for a scheduling entity 1700 employing a processing system 1714. In some implementations, the scheduling entity 1700 may correspond to any of the base stations (e.g., gNBs) or scheduling entities as illustrated in any of FIGS. 1, 3, 4, and 7-13.

In accordance with various aspects of the disclosure, an element, or any portion of an element, or any combination of elements may be implemented with the processing system 1714. The processing system may include one or more processors 1704. The processing system 1714 may be substantially the same as the processing system 1614 illustrated in FIG. 16, including a bus interface 1708, a bus 1702, memory 1705, a processor 1704, a transceiver 1710, an antenna array 1720, and a computer-readable medium 1706. The memory 1705 may store relaying information 1715 (e.g., relaying parameters) used by the processor 1704 in cooperation with the transceiver 1710 for scheduling relaying operations. Furthermore, the scheduling entity 1700 may include an interface 1730 (e.g., a network interface) that provides a means for communicating with at least one other apparatus within a core network and with at least one radio access network.

The scheduling entity 1700 may be configured to perform any one or more of the operations described herein (e.g., as described above in conjunction with FIGS. 1-13 and as described below in conjunction with FIGS. 18-17). In some aspects of the disclosure, the processor 1704, as utilized in the scheduling entity 1700, may include circuitry configured for various functions.

The processor 1704 may be configured to generate, schedule, and modify a resource assignment or grant of time-frequency resources (e.g., a set of one or more resource elements). For example, the processor 1704 may schedule time-frequency resources within a plurality of time division duplex (TDD) and/or frequency division duplex (FDD) subframes, slots, and/or mini-slots to carry user data traffic and/or control information to and/or from multiple UEs.

The processor 1704 may be configured to schedule resources for the transmission of sidelink signals, downlink signals, or uplink signals. The processor 1704 may be configured to schedule resources for relaying operations.

In some aspects of the disclosure, the processor 1704 may include communication and processing circuitry 1741. The communication and processing circuitry 1744 may be configured to communicate with a UE. The communication and processing circuitry 1741 may include one or more hardware components that provide the physical structure that performs various processes related to communication (e.g., signal reception and/or signal transmission) as described herein. The communication and processing circuitry 1741 may further include one or more hardware components that provide the physical structure that performs various processes related to signal processing (e.g., processing a received signal and/or processing a signal for transmission) as described herein. The communication and processing circuitry 1741 may further be configured to execute communication and processing software 1751 included on the computer-readable medium 1706 to implement one or more functions described herein.

The communication and processing circuitry 1741 may further be configured to receive an indication from the UE. For example, the indication may be included in a MAC-CE carried in a Uu PUSCH or a PSCCH, or included in a Uu RRC message or an SL RRC message, or included in a dedicated Uu PUCCH or PUSCH. The communication and processing circuitry 1741 may further be configured to receive a scheduling request from a UE for an uplink grant or a sidelink grant.

In some implementations wherein the communication involves receiving information, the communication and processing circuitry 1741 may obtain information from a component of the scheduling entity 1700 (e.g., from the transceiver 1710 that receives the information via radio frequency signaling or some other type of signaling suitable for the applicable communication medium), process (e.g., decode) the information, and output the processed information. For example, the communication and processing circuitry 1741 may output the information to another component of the processor 1704, to the memory 1705, or to the bus interface 1708. In some examples, the communication and processing circuitry 1741 may receive one or more of signals, messages, other information, or any combination thereof. In some examples, the communication and processing circuitry 1741 may receive information via one or more channels. In some examples, the communication and processing circuitry 1741 may include functionality for a means for receiving. In some examples, the communication and processing circuitry 1741 may include functionality for a means for decoding.

In some implementations wherein the communication involves sending (e.g., transmitting) information, the communication and processing circuitry 1741 may obtain information (e.g., from another component of the processor 1704, the memory 1705, or the bus interface 1708), process (e.g., encode) the information, and output the processed information. For example, the communication and processing circuitry 1741 may output the information to the transceiver 1710 (e.g., that transmits the information via radio frequency signaling or some other type of signaling suitable for the applicable communication medium). In some examples, the communication and processing circuitry 1741 may send one or more of signals, messages, other information, or any combination thereof. In some examples, the communication and processing circuitry 1741 may send information via one or more channels. In some examples, the communication and processing circuitry 1741 may include functionality for a means for sending (e.g., a means for transmitting). In some examples, the communication and processing circuitry 1741 may include functionality for a means for encoding.

The processor 1704 may further include relaying parameter acquisition circuitry 1742, configured to perform one or more of the relaying parameter acquisition-related operations described herein (e.g., including those described in conjunction with FIGS. 6-13). In some examples, the relaying parameter acquisition circuitry 1742 may include functionality for a means for receiving a relaying parameter. For example, the relaying parameter acquisition circuitry 1742 may cooperate with the communication and processing circuitry 1741 to receive a relaying parameter from a wireless communication device via a media access control-control element (MAC-CE) over a Uu interface, a radio resource control (RRC) message over a Uu interface, a physical uplink channel (PUCCH) over Uu interface, a sidelink MAC-CE, a sidelink RRC message, a physical sidelink control channel (PSCCH), or a combination thereof. The relaying parameter acquisition circuitry 1742 may further be configured to execute relaying parameter acquisition software 1752 stored on the computer-readable medium 1706 to implement one or more functions described herein.

The processor 1704 may further include scheduling circuitry 1743, configured to perform one or more of the scheduling-related operations described herein (e.g., including those described in conjunction with FIGS. 6-13). In some examples, the scheduling circuitry 1743 may include functionality for a means for generating scheduling information. For example, the scheduling circuitry 1743 may determine that a wireless communication device is able to support a relay operating and then schedule resources for the relay operation. In some examples, a determination as to whether the wireless communication device is able to support a relay operation is based on a relaying parameter (e.g., can the wireless communication device buffer and relay a required number of packets). In some examples, a determination as to the resources to be scheduled for a relay operation is based on the relaying parameter (e.g., a switching time, a resting time, a duplex capability, etc.). In some examples, the scheduling circuitry 1743 may include functionality for a means for transmitting scheduling information. For example, the scheduling circuitry 1743 may cooperate with the communication and processing circuitry 1441 to transmit a PDCCH or a PSCCH that specifies resources for a relay operation. The scheduling circuitry 1743 may further be configured to execute scheduling software 1753 stored on the computer-readable medium 1706 to implement one or more functions described herein.

Figure 18:
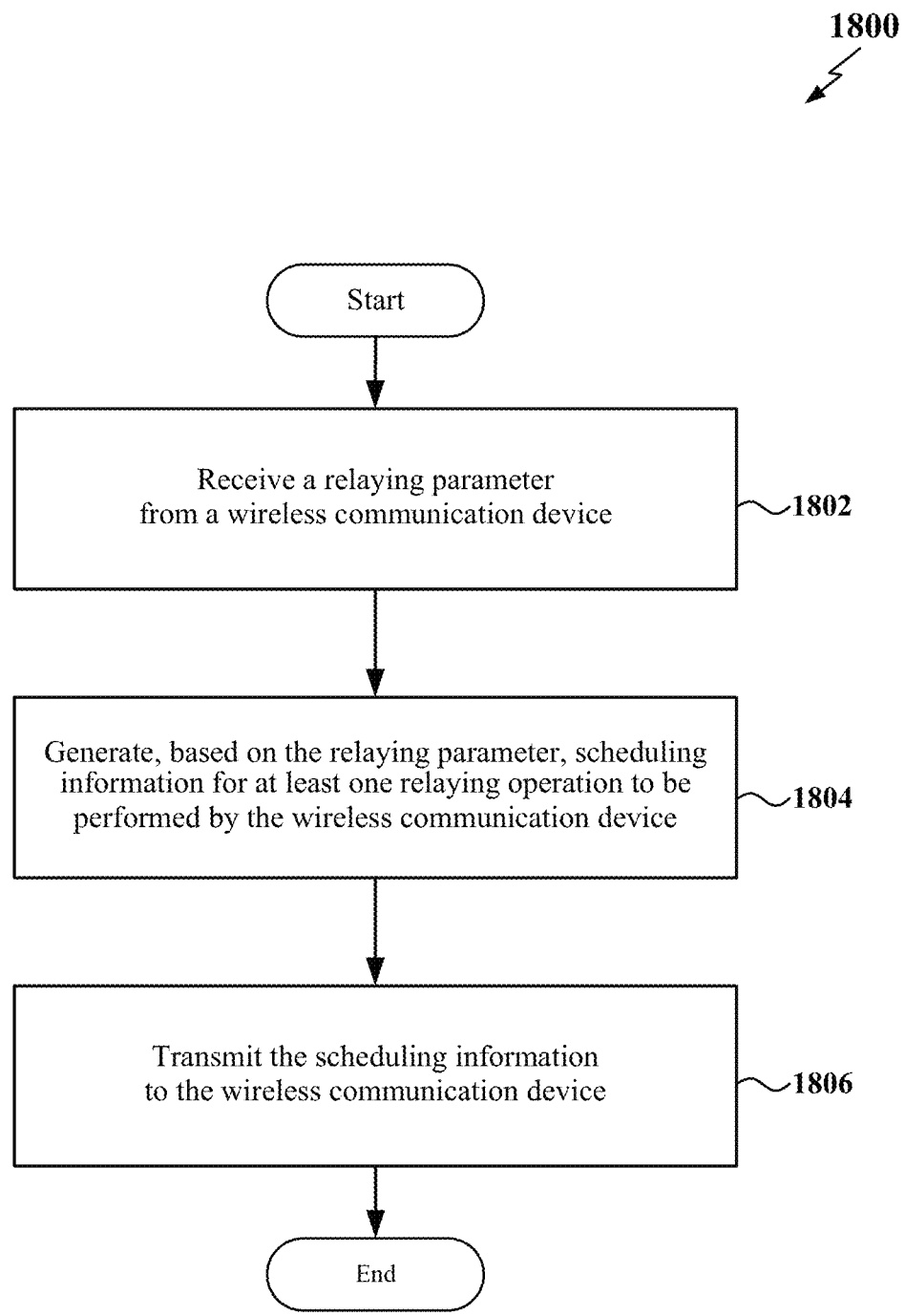
FIG. 18 is a flow chart of an example method for scheduling a relaying operation according to some aspects.

FIG. 18 is a flow chart of a method 1800 for a scheduling entity according to some aspects. As described below, some or all illustrated features may be omitted in a particular implementation within the scope of the present disclosure, and some illustrated features may not be required for implementation of all examples. In some examples, the method 1800 may be performed by the scheduling entity 1700 (e.g., performed by the processing system 1714), as described above and illustrated in FIG. 17, by a processor or processing system, or by any suitable means for carrying out the described functions.

At block 1802, a scheduling entity may receive a relaying parameter from a wireless communication device. For example, the relaying parameter acquisition circuitry 1742 in cooperation with the communication and processing circuitry 1741 and the transceiver 1710, shown and described above in connection with FIG. 17, may provide a means to receive the relaying parameter in a message sent on a resource scheduled for the wireless communication device by the scheduling entity. In some examples, receiving the relaying parameter may include receiving the relaying parameter via at least one of: a media access control-control element (MAC-CE) over a base station air interface, a radio resource control (RRC) message over the base station air interface, a physical uplink channel (PUCCH) over the base station air interface, a sidelink MAC-CE, a sidelink RRC message, a physical sidelink control channel (PSCCH), or a combination thereof.

At block 1804, the scheduling entity may generate, based on the relaying parameter, scheduling information for at least one relaying operation to be performed by the wireless communication device. For example, the scheduling circuitry 1743 may provide a means to determine, based on the relaying parameter, that a wireless communication device currently has sufficient relaying resources to support a relay operation. In addition, the scheduling circuitry 1743 may provide a means to schedule resources for the relay operation (e.g., depending on the relaying parameter).

In some examples, the relaying parameter may include an indication of an amount of data that the wireless communication device is capable of relaying. In some examples, the relaying parameter may include an indication of an amount of data that the wireless communication device is capable of buffering for relaying. In some examples, generating the scheduling information may include scheduling a quantity of resources for the at least one relaying operation based on the amount of data.

In some examples, the relaying parameter may include switching time information associated with a switch by the wireless communication device from a first type of relaying to a second type of relaying, where the second type of relaying is different from the first type of relaying. In some examples, generating the scheduling information may include scheduling first resources for the first type of relaying based on the switching time information and scheduling second resources for the second type of relaying based on the switching time information.

In some examples, the relaying parameter may include an indication of a quantity of concurrent relaying operations supported by the wireless communication device. In some examples, generating the scheduling information may include scheduling resources for the concurrent relaying operations. In some examples, the scheduling resources for the concurrent relaying operations may include scheduling at least one of: a first set of resources for a first quantity of concurrent relaying operations of a first type, a second set of resources for a second quantity of concurrent relaying operations of a second type, or a combination thereof.

In some examples, the relaying parameter may include an indication of a period of time during which the wireless communication device does not perform relaying. In some examples, generating the scheduling information may include scheduling resources for the at least one relaying operation during a time period that does not include the period of time.

In some examples, the relaying parameter may include a relaying duplexing capability of the wireless communication device. In some examples, generating the scheduling information may include scheduling half-duplex resources or full-duplex resources for the at least one relaying operation based on the relaying duplexing capability.

In some examples, the relaying parameter may include a relaying condition specified by the wireless communication device. In some examples, generating the scheduling information may include scheduling resources for the at least one relaying operation based on the relaying condition.

In some examples, the relaying parameter may include an energy harvesting parameter. In some examples, generating the scheduling information may include scheduling resources for the at least one relaying operation based on the energy harvesting parameter.

At block 1806, the scheduling entity may transmit the scheduling information to the wireless communication device. For example, the scheduling circuitry 1743 in cooperation with the communication and processing circuitry 1741 and the transceiver 1710, shown and described above in connection with FIG. 17, may provide a means to transmit a PDCCH or a PSCCH that specifies resources for a relay operation.

Figure 19:
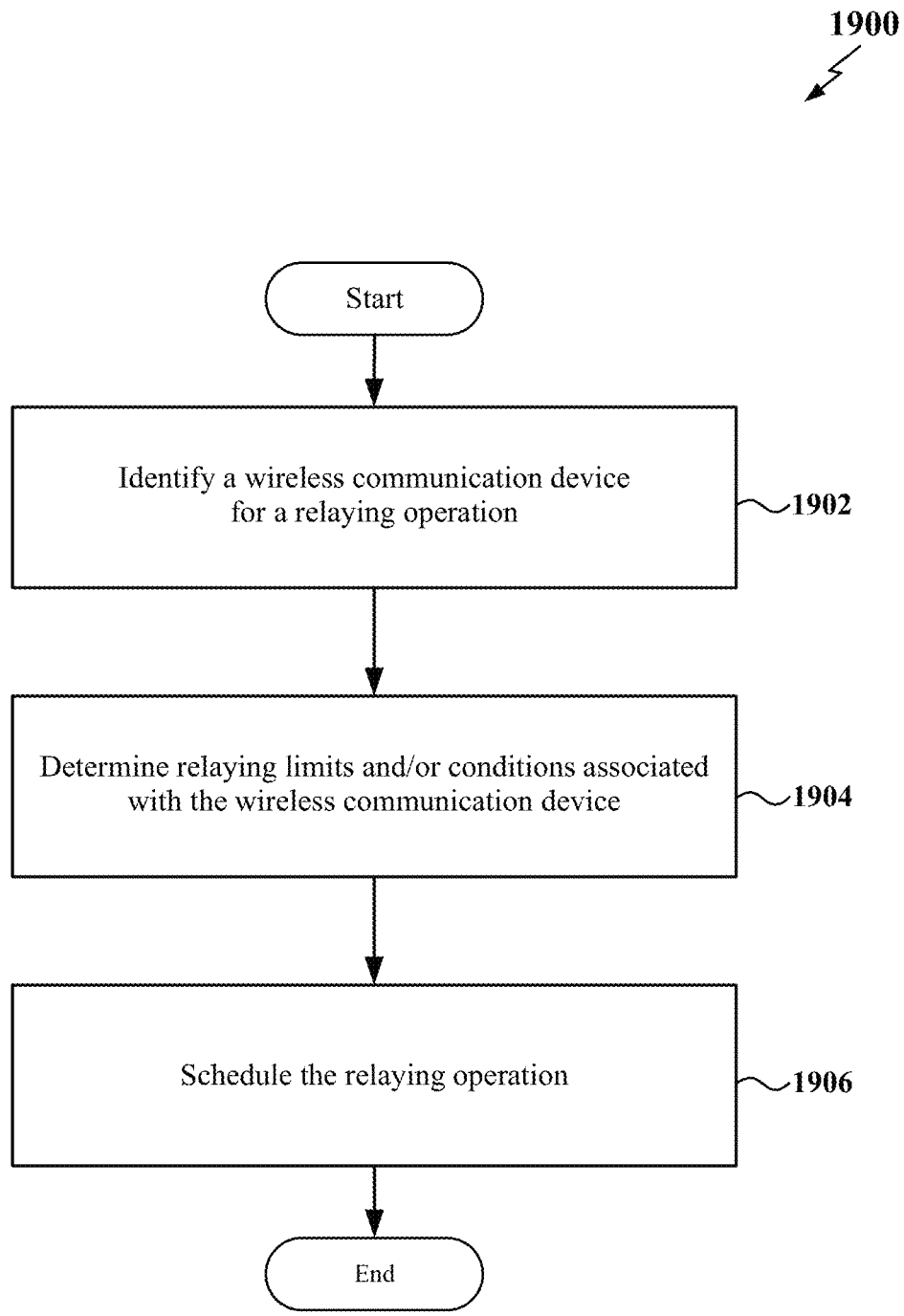
FIG. 19 is a flow chart of an example method for selecting a relay device according to some aspects.

FIG. 19 is a flow chart of a method 1900 for a scheduling entity according to some aspects. As described below, some or all illustrated features may be omitted in a particular implementation within the scope of the present disclosure, and some illustrated features may not be required for implementation of all examples. In some examples, the method 1900 may be performed by the scheduling entity 1700 (e.g., performed by the processing system 1714), as described above and illustrated in FIG. 17, by a processor or processing system, or by any suitable means for carrying out the described functions.

At block 1902, a scheduling entity may identify a wireless communication device for a relaying operation. For example, the scheduling circuitry 1743 may provide a means to identify a wireless communication device that has connectivity (e.g., sidelink connectivity to a sidelink device) to two nodes between which a relay operation is to be scheduled.

At block 1904, the scheduling entity may determine relaying limits and/or conditions (e.g., requirements) associated with the wireless communication device. For example, the scheduling circuitry 1743 may provide a means to determine whether a wireless communication device has sufficient capacity (e.g., buffering capacity) to support a relay operation and/or whether the wireless communication device supports the type of relaying to be scheduled (e.g., DF, AF, full-duplex, etc.).

At block 1906, the scheduling entity may schedule the relaying operation. For example, the scheduling circuitry 1743 may provide a means to schedule resources for the relay operation (e.g., based on the limits and/or conditions determined at block 1904).

The following provides an overview of several aspects of the present disclosure.

Aspect 1: A method for wireless communication at a wireless communication device, the method comprising: transmitting a relaying parameter for the wireless communication device to a scheduling entity; receiving scheduling information for at least one relaying operation from the scheduling entity after transmitting the relaying parameter; and relaying data according to the scheduling information.

Aspect 2: The method of aspect 1, further comprising: determining at least one of: a power capability of the wireless communication device or a hardware capability of the wireless communication device; and selecting the relaying parameter based on the power capability or the hardware capability.

Aspect 3: The method of aspect 1 or 2, wherein the relaying parameter comprises an indication of an amount of data that the wireless communication device is capable of relaying.

Aspect 4: The method of any of aspects 1 through 3, wherein the relaying parameter comprises an indication of an amount of data that the wireless communication device is capable of buffering for relaying.

Aspect 5: The method of any of aspects 1 through 4, wherein: the relaying parameter comprises switching time information associated with a switch by the wireless communication device from a first type of relaying to a second type of relaying; and the second type of relaying is different from the first type of relaying.

Aspect 6: The method of any of aspects 1 through 5, wherein the relaying parameter comprises an indication of a quantity of concurrent relaying operations supported by the wireless communication device.

Aspect 7: The method of aspect 6, wherein the quantity of concurrent relaying operations comprises at least one of: a first quantity of concurrent relaying operations for a first type of relaying, a second quantity of concurrent relaying operations for a second type of relaying, or a combination thereof.

Aspect 9: The method of any of aspects 1 through 7, wherein the relaying parameter comprises an indication of a period of time during which the wireless communication device does not perform relaying.

Aspect 10: The method of aspect 9, further comprising: determining a limitation of the wireless communication device; and selecting the period of time based on the limitation.

Aspect 11: The method of any of aspects 1 through 10, wherein the relaying parameter comprises a relaying duplexing capability of the wireless communication device.

Aspect 12: The method of any of aspects 1 through 11, wherein the relaying parameter comprises a relaying condition.

Aspect 13: The method of any of aspects 1 through 12, wherein the relaying condition comprises at least one of: a quantity of resources, a level of reliability, a data rate, a throughput, an error rate, or a combination thereof.

Aspect 14: The method of any of aspects 1 through 13, wherein the relaying parameter comprises an energy harvesting parameter.

Aspect 15: The method of aspect 14, wherein the energy harvesting parameter comprises at least one of: an amount of energy to be harvested by the wireless communication device, an amount of harvested energy required to commence relaying, a relaying duration associated with energy harvesting, or a combination thereof.

Aspect 16: The method of any of aspects 1 through 15, wherein the transmitting the relaying parameter comprises: transmitting the relaying parameter via at least one of: a media access control-control element (MAC-CE) over a base station air interface, a radio resource control (RRC) message over the base station air interface, a physical uplink channel (PUCCH) over the base station air interface, a sidelink MAC-CE, a sidelink RRC message, a physical sidelink control channel (PSCCH), or a combination thereof.

Aspect 17: A method for wireless communication at a scheduling entity, the method comprising: receiving a relaying parameter from a wireless communication device; generating, based on the relaying parameter, scheduling information for at least one relaying operation to be performed by the wireless communication device; and transmitting the scheduling information to the wireless communication device.

Aspect 18: The method of aspect 17, wherein: the relaying parameter comprises an indication of at least one of: an amount of data that the wireless communication device is capable of relaying, an amount of data that the wireless communication device is capable of buffering for relaying, or a combination thereof.

Aspect 19: The method of aspect 18, wherein the generating the scheduling information comprises: scheduling a quantity of resources for the at least one relaying operation based on the amount of data.

Aspect 20: The method of any of aspects 17 through 19, wherein: the relaying parameter comprises switching time information associated with a switch by the wireless communication device from a first type of relaying to a second type of relaying; and the second type of relaying is different from the first type of relaying.

Aspect 21: The method of aspect 20, wherein the generating the scheduling information comprises: scheduling first resources for the first type of relaying based on the switching time information and scheduling second resources for the second type of relaying based on the switching time information.

Aspect 22: The method of any of aspects 17 through 21, wherein: the relaying parameter comprises an indication of a quantity of concurrent relaying operations supported by the wireless communication device; and the generating the scheduling information comprises scheduling resources for the concurrent relaying operations.

Aspect 23: The method of aspect 22, wherein the scheduling resources for the concurrent relaying operations comprises scheduling at least one of: a first set of resources for a first quantity of concurrent relaying operations of a first type, a second set of resources for a second quantity of concurrent relaying operations of a second type, or a combination thereof.

Aspect 25: The method of any of aspects 17 through 23, wherein: the relaying parameter comprises an indication of a period of time during which the wireless communication device does not perform relaying.

Aspect 26: The method of aspect 25, wherein the generating the scheduling information comprises: scheduling resources for the at least one relaying operation during a time period that does not include the period of time.

Aspect 27: The method of any of aspects 17 through 26, wherein the relaying parameter comprises a relaying duplexing capability of the wireless communication device.

Aspect 28: The method of aspect 27, wherein the generating the scheduling information comprises: scheduling half-duplex resources or full-duplex resources for the at least one relaying operation based on the relaying duplexing capability.

Aspect 29: The method of any of aspects 17 through 28, wherein: the relaying parameter comprises a relaying condition specified by the wireless communication device; and the generating the scheduling information comprises scheduling resources for the at least one relaying operation based on the relaying condition.

Aspect 30: The method of any of aspects 17 through 29, wherein: the relaying parameter comprises an energy harvesting parameter; and the generating the scheduling information comprises scheduling resources for the at least one relaying operation based on the energy harvesting parameter.

Aspect 31: A wireless communication device comprising: a transceiver configured to communicate with a radio access network, a memory, and a processor communicatively coupled to the transceiver and the memory, wherein the processor and the memory are configured to perform any one of aspects 1 through 16.

Aspect 32: An apparatus configured for wireless communication comprising at least one means for performing any one of aspects 1 through 16.

Aspect 33: A non-transitory computer-readable medium storing computer-executable code, comprising code for causing an apparatus to perform any one of aspects 1 through 16.

Aspect 34: A scheduling entity comprising: a transceiver, a memory, and a processor communicatively coupled to the transceiver and the memory, wherein the processor and the memory are configured to perform any one of aspects 17 through 30.

Aspect 35: An apparatus configured for wireless communication comprising at least one means for performing any one of aspects 17 through 30.

Aspect 36: A non-transitory computer-readable medium storing computer-executable code, comprising code for causing an apparatus to perform any one of aspects 17 through 30.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4, 6-14, and 17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members.

As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device, the method comprising:
    transmitting a relaying parameter for the wireless communication device to a scheduling entity, the relaying parameter comprising an indication of a quantity of concurrent relaying operations supported by the wireless communication device, the quantity of concurrent relaying operations comprising at least two concurrent relaying operations;
    receiving scheduling information for at least one relaying operation from the scheduling entity after the relaying parameter is transmitted; and
    relaying data according to the scheduling information.

2. The method of claim 1, further comprising:
    retrieving capability information of the wireless communication device from a memory of the wireless communication device, the capability information indicating a power capability of the wireless communication device or a hardware capability of the wireless communication device; and
    selecting the relaying parameter based on the capability information, the selected relaying parameter indicating that the wireless communication device supports a particular reliability level or data rate for relay traffic.

3. The method of claim 1, wherein the relaying parameter comprises an indication of an amount of data that the wireless communication device is capable of relaying.

4. The method of claim 1, wherein the relaying parameter comprises an indication of an amount of data that the wireless communication device is capable of buffering for relaying.

5. The method of claim 1, wherein:
    the relaying parameter comprises switching time information associated with a switch by the wireless communication device from a first type of relaying to a second type of relaying; and the second type of relaying is different from the first type of relaying.

6. The method of claim 1, wherein the quantity of concurrent relaying operations comprises at least one of: a first quantity of concurrent relaying operations for a first type of relaying, a second quantity of concurrent relaying operations for a second type of relaying, or a combination thereof.

7. A wireless communication device, comprising:
a transceiver;
a memory; and
a processor communicatively coupled to the transceiver and the memory, wherein the processor and the memory are configured to:
transmit a relaying parameter for the wireless communication device to a scheduling entity via the transceiver, the relaying parameter comprising an indication of a quantity of concurrent relaying operations supported by the wireless communication device, the quantity of concurrent relaying operations comprising at least two concurrent relaying operations;
receive scheduling information for at least one relaying operation from the scheduling entity via the transceiver after the relaying parameter is transmitted; and
relay data according to the scheduling information.

8. The wireless communication device of claim 7, wherein the relaying parameter comprises an indication of a period of time during which the wireless communication device does not perform relaying.

9. The wireless communication device of claim 8, wherein the processor and the memory are further configured to:
determine a limitation of the wireless communication device; and
select the period of time based on the limitation.

10. The wireless communication device of claim 7, wherein the relaying parameter comprises a relaying duplexing capability of the wireless communication device.

11. The wireless communication device of claim 7, wherein the relaying parameter comprises a relaying condition.

12. The wireless communication device of claim 11, wherein the relaying condition comprises at least one of: a quantity of resources, a level of reliability, a data rate, a throughput, an error rate, or a combination thereof.

13. The wireless communication device of claim 7, wherein the relaying parameter comprises an energy harvesting parameter.

14. The wireless communication device of claim 13, wherein the energy harvesting parameter comprises at least one of: an amount of energy to be harvested by the wireless communication device, an amount of harvested energy required to commence relaying, a relaying duration associated with energy harvesting, or a combination thereof.

15. The wireless communication device of claim 7, wherein the processor and the memory are further configured to:
transmit the relaying parameter via at least one of: a media access control-control element (MAC-CE) over a base station air interface, a radio resource control (RRC) message over the base station air interface, a physical uplink channel (PUCCH) over the base station air interface, a sidelink MAC-CE, a sidelink RRC message, a physical sidelink control channel (PSCCH), or a combination thereof.

16. A method for wireless communication at a scheduling entity, the method comprising:
receiving a relaying parameter from a wireless communication device, the relaying parameter comprising an indication of a quantity of concurrent relaying operations supported by the wireless communication device, the quantity of concurrent relaying operations comprising at least two concurrent relaying operations;
generating, based on the relaying parameter, scheduling information for at least one relaying operation to be performed by the wireless communication device; and
transmitting the scheduling information to the wireless communication device.

17. The method of claim 16, wherein:
the relaying parameter comprises an indication of at least one of: an amount of data that the wireless communication device is capable of relaying, an amount of data that the wireless communication device is capable of buffering for relaying, or a combination thereof.

18. The method of claim 17, wherein the generating the scheduling information comprises:
scheduling a quantity of resources for the at least one relaying operation based on the amount of data.

19. The method of claim 16, wherein:
the relaying parameter comprises switching time information associated with a switch by the wireless communication device from a first type of relaying to a second type of relaying; and
the second type of relaying is different from the first type of relaying.

20. The method of claim 19, wherein the generating the scheduling information comprises:
scheduling first resources for the first type of relaying based on the switching time information and scheduling second resources for the second type of relaying based on the switching time information.

21. The method of claim 16, wherein:
the generating the scheduling information comprises scheduling resources for the concurrent relaying operations.

22. The method of claim 21, wherein the scheduling resources for the concurrent relaying operations comprises scheduling at least one of: a first set of resources for a first quantity of concurrent relaying operations of a first type, a second set of resources for a second quantity of concurrent relaying operations of a second type, or a combination thereof.

23. A scheduling entity, comprising:
a transceiver;
a memory; and
a processor communicatively coupled to the transceiver and the memory, wherein the processor and the memory are configured to:
receive a relaying parameter from a wireless communication device via the transceiver, the relaying parameter comprising an indication of a quantity of concurrent relaying operations supported by the wireless communication device, the quantity of concurrent relaying operations comprising at least two concurrent relaying operations;
generate, based on the relaying parameter, scheduling information for at least one relaying operation to be performed by the wireless communication device; and
transmit the scheduling information to the wireless communication device via the transceiver.

24. The scheduling entity of claim 23, wherein:
the relaying parameter comprises an indication of a period of time during which the wireless communication device does not perform relaying.

25. The scheduling entity of claim 24, wherein the processor and the memory are further configured to:
schedule resources for the at least one relaying operation during a time period that does not include the period of time.

26. The scheduling entity of claim 23, wherein the relaying parameter comprises a relaying duplexing capability of the wireless communication device.

27. The scheduling entity of claim 26, wherein the processor and the memory are further configured to:
schedule half-duplex resources or full-duplex resources for the at least one relaying operation based on the relaying duplexing capability.

28. The scheduling entity of claim 23, wherein:
the relaying parameter comprises a relaying condition specified by the wireless communication device; and
the processor and the memory are further configured to schedule resources for the at least one relaying operation based on the relaying condition.

29. The scheduling entity of claim 23, wherein:
the relaying parameter comprises an energy harvesting parameter; and
the processor and the memory are further configured to schedule resources for the at least one relaying operation based on the energy harvesting parameter.

* * * * *